US011589344B2

(12) United States Patent
Li

(10) Patent No.: US 11,589,344 B2
(45) Date of Patent: Feb. 21, 2023

(54) COMMUNICATIONS METHOD AND APPARATUS

(71) Applicant: Huawei Technologies Co., Ltd., Guangdong (CN)

(72) Inventor: Chao Li, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 17 days.

(21) Appl. No.: 17/132,550

(22) Filed: Dec. 23, 2020

(65) Prior Publication Data

US 2021/0120532 A1   Apr. 22, 2021

Related U.S. Application Data

(63) Continuation of application No. PCT/CN2019/090032, filed on Jun. 4, 2019.

(30) Foreign Application Priority Data

Jun. 27, 2018 (CN) .......................... 201810682275.6

(51) Int. Cl.
*H04W 72/04* (2009.01)
*H04W 76/14* (2018.01)
(Continued)

(52) U.S. Cl.
CPC ......... *H04W 72/042* (2013.01); *H04L 5/0053* (2013.01); *H04W 4/40* (2018.02);
(Continued)

(58) Field of Classification Search
CPC ... H04W 92/18; H04W 52/38; H04W 52/367; H04L 5/001; H04L 5/0007
See application file for complete search history.

(56) References Cited

U.S. PATENT DOCUMENTS

2013/0083783 A1\* 4/2013 Gupta ................... H04W 88/16
370/338
2015/0078297 A1   3/2015 Zheng
(Continued)

FOREIGN PATENT DOCUMENTS

CN     105246025 A    1/2016
CN     106793109 A    5/2017
(Continued)

OTHER PUBLICATIONS

3GPP TR 38.913 V14.3.0 (Jun. 2017),3rd Generation Partnership Project;Technical Specification Group Radio Access Network;Study on Scenarios and Requirements for Next Generation Access Technologies;(Release 14), total 39 pages.
(Continued)

*Primary Examiner* — Ayaz R Sheikh
*Assistant Examiner* — Debebe A Asefa
(74) *Attorney, Agent, or Firm* — Womble Bond Dickinson (US) LLP

(57) ABSTRACT

A method includes: obtaining, by a first communications device, a first carrier, where the first carrier is used to transmit a first message and a second message; obtaining, by the first communications device, a first transmission resource and a second transmission resource of the first carrier, where the first transmission resource is used to send the first message, the second transmission resource is used to send the second message, and the first transmission resource and the second transmission resource are different transmission resources; sending, by the first communications device, the first message on the first transmission resource by using a first wireless access technology; and sending, by the first communications device, the second message on the second transmission resource by using a second wireless access technology, where the first wireless
(Continued)

access technology and the second wireless access technology are different inter-device direct communications technologies.

17 Claims, 14 Drawing Sheets

(51) Int. Cl.
    *H04W 4/40*         (2018.01)
    *H04L 5/00*         (2006.01)
    *H04W 48/16*        (2009.01)
    *H04W 72/0453*     (2023.01)

(52) U.S. Cl.
    CPC ....... *H04W 48/16* (2013.01); *H04W 72/0453* (2013.01); *H04W 76/14* (2018.02)

(56) References Cited

U.S. PATENT DOCUMENTS

| | | | |
|---|---|---|---|
| 2016/0286603 A1* | 9/2016 | Vajapeyam | H04W 72/0453 |
| 2018/0167990 A1 | 6/2018 | Hua et al. | |
| 2018/0270682 A1* | 9/2018 | Zacharias | H04W 24/10 |
| 2019/0363843 A1* | 11/2019 | Gordaychik | H04W 52/54 |

FOREIGN PATENT DOCUMENTS

| | | |
|---|---|---|
| CN | 106899527 A | 6/2017 |
| CN | 107071914 A | 8/2017 |
| CN | 107105503 A | 8/2017 |
| CN | 108124281 A | 6/2018 |

OTHER PUBLICATIONS

Catt et al.,"Multiplexing between cellular link and D2D link",3GPP TSG RAN WG1 Meeting #75 San Francisco, USA, Nov. 11-15, 2013,R1-135093,total: 3pages.

Intel Corporation et al.,"Multi-Carrier WAN-Prose operation",3GPP TSG-RAN WG2 Meeti Dresden, Germany, 18tn 2#87 Aug. 2014,R2-143234,total:5pages.

CATT: "PUCCH Power Control and Priority in Power Scaling",3GPP Draft; R1-1707530 PUCCH Power Control, 3rdGeneration Partnership Project (3GPP), MobileCompetence Centre; 650, Route Des Lucioles; F-06921Sophia-Antipolis Cedex; France,vol. RAN WG1, No. Hangzhou, China; May 15, 2017-May 19, 2017 May 14, 2017(May 14, 2017), XP051272738,Retrieved from the Internet:URL:http://www.3gpp.org/ftp/Meetings_3GPP SYNC/RAN1/Docs/[retrieved on May 14, 2017].

Intel Corporation: "PUSCH and PUCCH Power Control",3GPP Draft; R1-1710586 PUCCH and PUSCH Power Control R1,3rd Generation Partnership Project (3GPP), MobileCompetence Centre; 650, Route Des Lucioles; F-06921Sophia-Antipolis Cedex; France,vol. RAN WG1, No. Qingdao, China; Jun. 27, 2017-Jun. 30, 2017 Jun. 17, 2017(Jun. 17, 2017), XP051305156,Retrieved from the Internet:U RL:http//www.3gpp.org/ftp/tsg_ran/WG1 RL 1/TSGR1_AH/NR_AH_1706/Docs/[retrieved on Jun. 17, 2017].

\* cited by examiner

COMMUNICATIONS METHOD AND APPARATUS

CROSS-REFERENCE TO RELATED APPLICATIONS

This application is a continuation of International Application No. PCT/CN2019/090032, filed on Jun. 4, 2019, which claims priority to Chinese Patent Application No. 201810682275.6, filed on Jun. 27, 2018. The disclosures of the aforementioned applications are hereby incorporated by reference in their entireties.

TECHNICAL FIELD

Embodiments of this application relate to the field of communications technologies, and in particular, to a communications method and apparatus.

BACKGROUND

With development of communications technologies, intelligent transportation technologies represented by the internet of vehicles have developed rapidly. A vehicle-to-everything (V2X) communications technology emerges accordingly. V2X may be vehicle-to-vehicle (V2V), vehicle-to-pedestrian (V2P), or vehicle-to-infrastructure (V2I).

For the V2X communications technology, in a 3rd generation partnership project (3GPP) long term evolution (LTE) system, standardization research on Rel-14 has been completed, and standardization work on Rel-15 is ongoing.

Currently, 3GPP has started research on a 5th generation communications technology (5G) system, and enhanced research on the V2X communications technology under a new technical framework of the 5G system is also to be started. In this case, a V2X communications technology in the LTE system and a V2X communications technology in the 5G system need to effectively coexist, to avoid a problem that vehicles cannot communicate with each other due to non-coexistence of the V2X communications technology in the LTE system and the V2X communications technology in the 5G system. However, currently, there is no method for achieving effective coexistence of the V2X communications technology in the LTE system and the V2X communications technology in the 5G system.

SUMMARY

Embodiments of this application provide a communications method and apparatus, to achieve effective coexistence of a V2X communications technology in an LTE system and a V2X communications technology in a 5G system.

To achieve the foregoing objective, the following technical solutions are used in the embodiments of this application.

According to a first aspect, a communication method is provided. A first communications device obtains a first carrier used to transmit a first message and a second message, and obtains a first transmission resource of the first carrier and a second transmission resource different from the first transmission resource. In this way, the first communications device can send the first message on the first transmission resource by using a first wireless access technology, and send the second message on the second transmission resource by using a second wireless access technology. Herein, the first wireless access technology and the second wireless access technology are different inter-device direct communications technologies.

Because the first wireless access technology and a second access network technology are different inter-device direct communications technologies, the first communications device can send the first message on the first transmission resource by using the first wireless access technology, and can further send the second message on the second transmission resource by using the second wireless access technology, to achieve coexistence of two different types of services. Correspondingly, if the first wireless access technology is a V2X communications technology in a 5G system, and the second wireless access technology is a V2X communications technology in an LTE system, effective coexistence of the V2X communications technology in the LTE system and the V2X communications technology in the 5G system can be achieved by using the communication method provided in this application.

In an embodiment, the first communications device further determines a first transmit power. In addition, the first communications device further determines a second transmit power. A sum of the first transmit power and the second transmit power is less than or equal to a configured power, and the configured power is preconfigured or is indicated by first signaling sent by a network device. Correspondingly, a method for sending the first message by the first communications device on the first transmission resource by using the first wireless access technology is: The first communications device sends the first message on the first transmission resource at the first transmit power and by using the first wireless access technology. A method for sending the second message by the first communications device on the second transmission resource by using the second wireless access technology is: The first communications device sends the second message on the second transmission resource at the second transmit power and by using the second wireless access technology.

The first transmission resource and the second transmission resource are different transmission resources on the first carrier, and the first communications device sends messages on different transmission resources at different transmit powers. In this application, the first communications device may occupy the first transmission resource and the second transmission resource in a frequency division multiplexing (FDM) manner or a time division multiplexing (TDM) manner. Regardless of a manner in which the first transmission resource and the second transmission resource are occupied, the sum of the first transmit power and the second transmit power is less than the configured power, to meet an actual communication requirement.

In an embodiment, the first communications device may further send first indication information used to indicate the first transmit power, so that a device receiving the first message can obtain accurate channel information during receiving measurement. In addition, the first communications device may further send second indication information used to indicate the second transmit power, so that a device receiving the second message can obtain accurate channel information during receiving measurement.

In an embodiment, when the first communications device occupies the first transmission resource and the second transmission resource in the TDM mode, a method for obtaining the first transmission resource and the second transmission resource of the first carrier by the first communications device is: First, the first communications device obtains a first resource set and a second resource set of the first carrier, where a time-domain resource unit of the first resource set is determined based on a subcarrier spacing of the first transmission resource, and a time-domain resource unit of the second resource set is determined based on a subcarrier spacing of the second transmission resource. Then, the first communications device obtains the first transmission resource from the first resource set based on first configuration information, and obtains the second transmission resource from the second resource set based on second configuration information, where the first configuration information is used to indicate at least one time-domain resource unit in the first resource set, the second configuration information is used to indicate at least one time-domain resource unit in the second resource set, the first configuration information is preconfigured or is indicated by second signaling sent by the network device, and the second configuration information is preconfigured or is indicated by third signaling sent by the network device.

Similarly, the first resource set is preconfigured or is indicated by signaling sent by the network device, and the second resource set is preconfigured or is indicated by signaling sent by the network device.

In an embodiment, the first communications device further sends third indication information used to indicate the first transmission resource. In an embodiment, the first communications device further sends fourth indication information used to indicate the second transmission resource.

In an embodiment, when the first communications device occupies the first transmission resource and the second transmission resource in the TDM mode, a method for obtaining the first transmission resource of the first carrier by the first communications device is: First, the first communications device obtains a third resource set and a fourth resource set of the first carrier, where the fourth resource set is a subset of the third resource set, a time-domain resource unit of the third resource set is determined based on a subcarrier spacing of the second transmission resource, and a time-domain resource unit of the fourth resource set is determined based on a subcarrier spacing of the first transmission resource. Then, the first communications device obtains the first transmission resource from the fourth resource set based on third configuration information, where the third configuration information is used to indicate at least one time-domain resource unit in the fourth resource set, and the third configuration information is preconfigured or is indicated by fourth signaling sent by the network device.

It can be learned that the first communications device may use the subcarrier spacing of the second transmission resource as a reference subcarrier spacing, and obtain the third resource set and the fourth resource set by using the reference subcarrier spacing, to obtain the first transmission resource from the fourth resource set. In this manner, the first communications device may obtain the second transmission resource based on fourth configuration information, where the fourth configuration information is preconfigured or is indicated by fifth signaling sent by the network device.

In an embodiment, the first device sends fifth indication information used to indicate the third resource set and sixth indication information used to indicate the fourth resource set. In an embodiment, in a process of sending the second message, the first device may further send the fifth indication information used to indicate the third resource set.

In an embodiment, a method for obtaining the first carrier by the first communications device is: The first communications device determines the first carrier. Alternatively, the first communications device receives, from the network device, carrier indication information used to indicate the first carrier, and obtains the first carrier according to the carrier indication information.

It can be learned that the first carrier in this application may be indicated by the network device by using the carrier indication information, or may be preconfigured.

In an embodiment, the first transmit power is determined by the first communications device based on a priority of the first message, and the second transmit power is determined by the first communications device based on a priority of the second message. Alternatively, the first transmit power is preconfigured or is indicated by signaling sent by the network device, and the second transmit power is preconfigured or is indicated by signaling sent by the network device.

It can be learned that a transmit power may be determined by the first communications device based on a priority of a message, or may be determined by the first communications device based on a configuration of the network device, or may be preconfigured.

In an embodiment, the first transmission resource and the second transmission resource have a same radio frame number in time domain. Alternatively, there is a preset deviation value between radio frame numbers of the first transmission resource and the second transmission resource in time domain, and the preset deviation value is preset or is indicated by signaling sent by the network device.

In this application, timings of the first transmission resource and the second transmission resource are aligned in the unit of radio frames. In this way, when the two transmission resources are multiplexed in time domain, a resource waste can be reduced.

In another possible design, the preset deviation value is N times a slot length of the first transmission resource, where N is a positive integer.

In an embodiment, a type of a synchronization reference source used by the first communications device to send the first message is the same as that used by the first communications device to send the second message. Alternatively, a synchronization reference source transmission resource used by the first communications device to send the first message is the same as a synchronization reference source used by the first communications device to send the second message. In this way, a timing of transmission of the first message remains the same as that of transmission of the second message, thereby avoiding mutual interference caused by different timings in a message transmission process.

In an embodiment, the first transmit power at which the first communications device sends the first message is positively correlated with the subcarrier spacing of the first transmission resource.

In an embodiment, the second wireless access technology may alternatively be a wireless access technology between a terminal and an access network device.

According to a second aspect, a communications device is provided. The communications device is a first communications device. The communications device includes an obtaining unit and a sending unit. Functions implemented by units and modules provided in this application are as follows: The obtaining unit is configured to: obtain a first carrier, where the first carrier is used to transmit a first message and a second message; and obtain a first transmission resource and a second transmission resource of the first carrier, where the first transmission resource is used to send the first message, the second transmission resource is used to send the second message, and the first transmission resource and the second transmission resource are different transmission resources. The sending unit is configured to: send, by using a first wireless access technology, the first message on the first transmission resource obtained by the obtaining unit; and send, by using a second wireless access technology, the second message on the second transmission resource obtained by the obtaining unit, where the first wireless access technology and the second wireless access technology are different inter-device direct communications technologies.

In an embodiment, the communications device further includes a determining unit. The determining unit is configured to determine a first transmit power. In addition, the determining unit is further configured to determine a second transmit power. A sum of the first transmit power and the second transmit power is less than or equal to a configured power, and the configured power is preconfigured or is indicated by first signaling sent by a network device. The sending unit is configured to: send the first message on the first transmission resource at the first transmit power determined by the determining unit and by using the first wireless access technology, and send the second message on the second transmission resource at the second transmit power determined by the determining unit and by using the second wireless access technology.

In an embodiment, the sending unit is further configured to send first indication information, where the first indication information is used to indicate the first transmit power. In addition, the sending unit is further configured to send second indication information, where the second indication information is used to indicate the second transmit power.

In an embodiment, the sending unit is configured to occupy the first transmission resource and the second transmission resource in a TDM mode.

In an embodiment, the obtaining unit is configured to: obtain a first resource set and a second resource set of the first carrier, where a time-domain resource unit of the first resource set is determined based on a subcarrier spacing of the first transmission resource, and a time-domain resource unit of the second resource set is determined based on a subcarrier spacing of the second transmission resource; and obtain the first transmission resource from the first resource set based on first configuration information, and obtain the second transmission resource from the second resource set based on second configuration information, where the first configuration information is used to indicate at least one time-domain resource unit in the first resource set, the second configuration information is used to indicate at least one time-domain resource unit in the second resource set, the first configuration information is preconfigured or is indicated by second signaling sent by the network device, and the second configuration information is preconfigured or is indicated by third signaling sent by the network device.

In an embodiment, the obtaining unit is configured to: obtain a third resource set and a fourth resource set of the first carrier, where the fourth resource set is a subset of the third resource set, a time-domain resource unit of the third resource set is determined based on a subcarrier spacing of the second transmission resource, and a time-domain resource unit of the fourth resource set is determined based on a subcarrier spacing of the first transmission resource; and obtain the first transmission resource from the fourth resource set based on third configuration information, where the third configuration information is used to indicate at least one time-domain resource unit in the fourth resource set, and the third configuration information is preconfigured or is indicated by fourth signaling sent by the network device.

In an embodiment, the first transmission resource and the second transmission resource both belong to a first resource pool and are orthogonal to each other. Alternatively, the first transmission resource belongs to a second resource pool, the second transmission resource belongs to a third resource pool, and the second resource pool and the third resource pool are orthogonal to each other.

In an embodiment, the obtaining unit is configured to: determine the first carrier; or receive carrier indication information from the network device, where the carrier indication information is used to indicate the first carrier, and obtain the first carrier according to the carrier indication information.

In an embodiment, the determining unit is configured to: determine the first transmit power based on a priority of the first message, and determine the second transmit power based on a priority of the second message. In an embodiment, the first transmit power is preconfigured or is indicated by signaling sent by the network device, and the second transmit power is preconfigured or is indicated by signaling sent by the network device.

In an embodiment, the first transmission resource and the second transmission resource have a same radio frame number in time domain. Alternatively, there is a preset deviation value between radio frame numbers of the first transmission resource and the second transmission resource in time domain, and the preset deviation value is preset or is indicated by signaling sent by the network device.

In an embodiment, the preset deviation value is N times a slot length of the first transmission resource, where N is a positive integer.

In an embodiment, a type of a synchronization reference source used by the sending unit to send the first message is the same as that used to send the second message. Alternatively, a synchronization reference source transmission resource used to send the first message is the same as a synchronization reference source used to send the second message.

In an embodiment, the first transmit power is positively correlated with the subcarrier spacing of the first transmission resource.

In an embodiment, the second wireless access technology may alternatively be a wireless access technology between a terminal and an access network device.

According to a third aspect, a communications device is provided. The communications device includes: one or more processors, a memory, and a communications interface. The memory and the communications interface are coupled to the one or more processors. The communications device communicates with another device through the communications interface. The memory is configured to store computer program code. The computer program code includes an instruction. When the one or more processors execute the instruction, the communications device performs the communication method according to any one of the first aspect and the possible implementations of the first aspect.

According to a fourth aspect, a computer-readable storage medium is further provided. The computer-readable storage medium stores an instruction. When the instruction is run on a communications device, the communications device is enabled to perform the communication method according to any one of the first aspect and the possible implementations of the first aspect.

According to a fifth aspect, a computer program product including an instruction is further provided. When the computer program product is run on a communications device, the communications device is enabled to perform the communication method according to any one of the first aspect and the possible implementations of the first aspect.

According to a sixth aspect, a communication method is provided. A second communications device obtains a first carrier used to transmit a first message and a second message, and obtains a first transmission resource of the first carrier and a second transmission resource different from the first transmission resource. In this way, the second communications device can receive the first message on the first transmission resource by using a first wireless access technology, and receive the second message on the second transmission resource by using a second wireless access technology. Herein, the first wireless access technology and the second wireless access technology are different inter-device direct communications technologies.

Because the first wireless access technology and a second access network technology are different inter-device direct communications technologies, a first communications device can receive the first message on the first transmission resource by using the first wireless access technology, and can further receive the second message on the second transmission resource by using the second wireless access technology, to achieve coexistence of two different types of services. Correspondingly, if the first wireless access technology is a V2X communications technology in a 5G system, and the second wireless access technology is a V2X communications technology in an LTE system, effective coexistence of the V2X communications technology in the LTE system and the V2X communications technology in the 5G system can be achieved by using the communication method provided in this application.

In an embodiment, the second communications device further obtains first indication information used to indicate a transmit power of the first message. In addition, the second communications device further obtains second indication information used to indicate a transmit power of the second message. A sum of the transmit power of the first message and the transmit power of the second message is less than or equal to a configured power, and the configured power is preconfigured or is indicated by signaling sent by a network device.

In an embodiment, a method for obtaining the first transmission resource and the second transmission resource of the first carrier by the second communications device is: First, the second communications device obtains a first resource set and a second resource set of the first carrier, where a time-domain resource unit of the first resource set is determined based on a subcarrier spacing of the first transmission resource, and a time-domain resource unit of the second resource set is determined based on a subcarrier spacing of the second transmission resource. Then, the second communications device obtains the first transmission resource from the first resource set based on first configuration information, and obtains the second transmission resource from the second resource set based on second configuration information, where the first configuration information is used to indicate at least one time-domain resource unit in the first resource set, the second configuration information is used to indicate at least one time-domain resource unit in the second resource set, the first configuration information is preconfigured, is indicated by second signaling sent by the network device, or is sent by a first communications device, and the second configuration information is preconfigured, is indicated by third signaling sent by the network device, or is sent by a third communications device.

In an embodiment, a method for obtaining the first transmission resource of the first carrier by the second communications device is: First, the second communications device obtains a third resource set and a fourth resource set of the first carrier, where the fourth resource set is a subset of the third resource set, a time-domain resource unit of the third resource set is determined based on a subcarrier spacing of the second transmission resource, and a time-domain resource unit of the fourth resource set is determined based on a subcarrier spacing of the first transmission resource. Then, the second communications device obtains the first transmission resource from the fourth resource set based on third configuration information, where the third configuration information is used to indicate at least one time-domain resource unit in the fourth resource set, and the third configuration information is preconfigured, is indicated by fourth signaling sent by the network device, or is sent by a first communications device.

In an embodiment, a method for obtaining the first carrier by the second communications device is: The second communications device determines the first carrier. Alternatively, the second communications device receives carrier indication information from the network device, where the carrier indication information is used to indicate the first carrier, and the second communications device obtains the first carrier according to the carrier indication information.

In an embodiment, the first transmission resource and the second transmission resource have a same radio frame number in time domain. Alternatively, there is a preset deviation value between radio frame numbers of the first transmission resource and the second transmission resource in time domain, and the preset deviation value is preset or is indicated by signaling sent by the network device.

In this application, timings of the first transmission resource and the second transmission resource are aligned in the unit of radio frames. In this way, when the two transmission resources are multiplexed in time domain, a resource waste can be reduced.

In another possible design, the preset deviation value is N times a slot length of the first transmission resource, where N is a positive integer.

In an embodiment, a type of a synchronization reference source used by the second communications device to receive the first message is the same as that used by the second communications device to receive the second message. Alternatively, a synchronization reference source transmission resource used by the second communications device to receive the first message is the same as a synchronization reference source used by the second communications device to receive the second message. In this way, a timing of transmission of the first message remains the same as that of transmission of the second message, thereby avoiding mutual interference caused by different timings in a message transmission process.

In an embodiment, the second wireless access technology may alternatively be a wireless access technology between a terminal and an access network device.

According to a seventh aspect, a communications device is provided. The communications device is a second communications device. The communications device includes an obtaining unit and a receiving unit.

In an embodiment, the obtaining unit is configured to: obtain a first carrier, where the first carrier is used to transmit a first message and a second message; and obtain a first transmission resource and a second transmission resource of the first carrier, where the first transmission resource is used to receive the first message, the second transmission resource is used to receive the second message, and the first transmission resource is different from the second transmission resource. The receiving unit is configured to: receive, by using a first wireless access technology, the first message on the first transmission resource obtained by the obtaining unit; and receive, by using a second wireless access technology, the second message on the second transmission resource obtained by the obtaining unit, where the first wireless access technology and the second wireless access technology are different inter-device direct communications technologies.

In an embodiment, the obtaining unit is further configured to: obtain first indication information, and obtain second indication information, where the first indication information is used to indicate a transmit power of the first message, the second indication information is used to indicate a transmit power of the second message, a sum of the transmit power of the first message and the transmit power of the second message is less than or equal to a configured power, and the configured power is preconfigured or is indicated by signaling sent by a network device.

In an embodiment, the obtaining unit is configured to: obtain a first resource set and a second resource set of the first carrier, where a time-domain resource unit of the first resource set is determined based on a subcarrier spacing of the first transmission resource, and a time-domain resource unit of the second resource set is determined based on a subcarrier spacing of the second transmission resource; and obtain the first transmission resource from the first resource set based on first configuration information, and obtain the second transmission resource from the second resource set based on second configuration information, where the first configuration information is used to indicate at least one time-domain resource unit in the first resource set, the second configuration information is used to indicate at least one time-domain resource unit in the second resource set, the first configuration information is preconfigured, is indicated by second signaling sent by the network device, or is sent by a first communications device, and the second configuration information is preconfigured, is indicated by third signaling sent by the network device, or is sent by a third communications device.

In an embodiment, the obtaining unit is configured to: obtain a third resource set and a fourth resource set of the first carrier, where the fourth resource set is a subset of the third resource set, a time-domain resource unit of the third resource set is determined based on a subcarrier spacing of the second transmission resource, and a time-domain resource unit of the fourth resource set is determined based on a subcarrier spacing of the first transmission resource; and obtain the first transmission resource from the fourth resource set based on fourth configuration information, where third configuration information is used to indicate at least one time-domain resource unit in the fourth resource set, and the third configuration information is preconfigured, is indicated by fourth signaling sent by the network device, or is sent by a first communications device.

In an embodiment, the first transmission resource and the second transmission resource both belong to a first resource pool and are orthogonal to each other. Alternatively, the first transmission resource belongs to a second resource pool, the second transmission resource belongs to a third resource pool, and the second resource pool and the third resource pool are orthogonal to each other.

In an embodiment, the obtaining unit is configured to: determine the first carrier; or receive carrier indication information from the network device, where the carrier indication information is used to indicate the first carrier, and obtain the first carrier according to the carrier indication information.

In an embodiment, the first transmission resource and the second transmission resource have a same radio frame number in time domain. Alternatively, there is a preset deviation value between radio frame numbers of the first transmission resource and the second transmission resource in time domain, and the preset deviation value is preset or is indicated by signaling sent by the network device.

In an embodiment, the preset deviation value is N times a slot length of the first transmission resource, where N is a positive integer.

In an embodiment, a type of a synchronization reference source used by the receiving unit to receive the first message is the same as that used to receive the second message. Alternatively, a synchronization reference source transmission resource used by the receiving unit to receive the first message is the same as a synchronization reference source used by the second communications device to receive the second message.

In an embodiment, the second wireless access technology may alternatively be a wireless access technology between a terminal and an access network device.

According to an eighth aspect, a communications device is provided. The communications device includes: one or more processors, a memory, and a communications interface. The memory and the communications interface are coupled to the one or more processors. The communications device communicates with another device through the communications interface. The memory is configured to store computer program code. The computer program code includes an instruction. When the one or more processors execute the instruction, the communications device performs the communication method according to any one of the sixth aspect and the possible implementations of the sixth aspect.

According to a ninth aspect, a computer-readable storage medium is further provided. The computer-readable storage medium stores an instruction. When the instruction is run on a communications device, the communications device is enabled to perform the communication method according to any one of the sixth aspect and the possible implementations of the sixth aspect.

According to a tenth aspect, a computer program product including an instruction is further provided. When the computer program product is run on a communications device, the communications device is enabled to perform the communication method according to any one of the sixth aspect and the possible implementations of the sixth aspect.

In any one of the foregoing aspects or the possible embodiments, the first transmission resource and the second transmission resource both belong to the first resource pool and are orthogonal to each other. Alternatively, the first transmission resource belongs to the second resource pool, the second transmission resource belongs to the third resource pool, and the second resource pool and the third resource pool are orthogonal to each other. Herein, "orthogonal" means that occupied frequency domain resources are different. Orthogonality of the first transmission resource and the second transmission resource can achieve fair coexistence of two types of services.

In any one of the foregoing aspects or the possible embodiments, the subcarrier spacing of the first transmission resource and the subcarrier spacing of the second transmission resource may be separately configured or separately defined. In an actual application, the subcarrier spacing of the first transmission resource and the subcarrier spacing of the second transmission resource may be equal or not equal.

According to an eleventh aspect, a communication method is provided. A first communications device obtains a first carrier used to transmit a first message and a carrier used to transmit a second message, and then determines a first transmit power for sending the first message on the first carrier and a second transmit power for sending the second message on the second carrier, where a sum of the first transmit power and the second transmit power is less than or equal to a configured power. In this way, the first communications device can send the first message on the first carrier at the first transmit power and by using a first wireless access technology, and send the second message on the second carrier at the second transmit power and by using a second wireless access technology. The first wireless access technology and the second wireless access technology are different inter-device direct communications technologies, and the configured power is preconfigured or is indicated by first signaling sent by a network device.

Because the first wireless access technology and a second access network technology are different inter-device direct communications technologies, the first communications device can send the first message on the first carrier by using the first wireless access technology, and can further send the second message on the second carrier by using the second wireless access technology, to achieve coexistence of two different types of services. Correspondingly, if the first wireless access technology is a V2X communications technology in a 5G system, and the second wireless access technology is a V2X communications technology in an LTE system, effective coexistence of the V2X communications technology in the LTE system and the V2X communications technology in the 5G system can be achieved by using the communication method provided in this application.

In an embodiment, a method for determining, by the first communications device, the first transmit power for sending the first message on the first carrier is: The first communications device determines the first transmit power based on a priority of the first carrier or a priority of the first message. A method for determining, by the first communications device, the second transmit power for sending the second message on the second carrier is: The first communications device determines the second transmit power based on a priority of the second carrier or a priority of the second message.

In an embodiment, if the first communications device does not send the first message but sends the second message in a first slot, the first transmit power is 0, and the second transmit power is the configured power.

In an embodiment, the first transmission resource and the second transmission resource have a same radio frame number in time domain.

In this application, timings of the first transmission resource and the second transmission resource are aligned in the unit of radio frames. In this way, when the two transmission resources are multiplexed in time domain, a resource waste can be reduced.

In an embodiment, a type of a synchronization reference source used by the first communications device to send the first message is the same as that used by the first communications device to send the second message. Alternatively, a synchronization reference source transmission resource used by the first communications device to send the first message is the same as a synchronization reference source used by the first communications device to send the second message. In this way, a timing of transmission of the first message remains the same as that of transmission of the second message, thereby avoiding mutual interference caused by different timings in a message transmission process.

In an embodiment, the first transmit power at which the first communications device sends the first message is positively correlated with a subcarrier spacing of the first transmission resource.

In an embodiment, the second wireless access technology may alternatively be a wireless access technology between a terminal and an access network device.

According to a twelfth aspect, a communications device is provided. The communications device is a first communications device. The communications device includes an obtaining unit, a determining unit, and a sending unit.

In an embodiment, the obtaining unit is configured to: obtain a first carrier used to transmit a first message, and obtain a carrier used to transmit a second message. The determining unit is configured to: determine a first transmit power for sending the first message on the first carrier obtained by the obtaining unit, and determine a second transmit power for sending the second message on the second carrier obtained by the obtaining unit, where a sum of the first transmit power and the second transmit power is less than or equal to a configured power. The sending unit is configured to: send the first message on the first carrier obtained by the obtaining unit, at the first transmit power determined by the determining unit and by using a first wireless access technology; and send the second message on the second carrier obtained by the obtaining unit, at the second transmit power determined by the determining unit and by using a second wireless access technology. The first wireless access technology and the second wireless access technology are different inter-device direct communications technologies, and the configured power is preconfigured or is indicated by first signaling sent by a network device.

In a possible design, the determining unit is configured to: determine the first transmit power based on a priority of the first carrier or a priority of the first message, and determine the second transmit power based on a priority of the second carrier or a priority of the second message.

In an embodiment, if the sending unit does not send the first message but sends the second message in a first slot, the first transmit power is 0, and the second transmit power is the configured power.

In an embodiment, the first transmission resource and the second transmission resource have a same radio frame number in time domain.

In an embodiment, a type of a synchronization reference source used by the sending unit to send the first message is the same as that used to send the second message. Alternatively, a synchronization reference source transmission resource used by the sending unit to send the first message is the same as a synchronization reference source used to send the second message.

In an embodiment, the first transmit power is positively correlated with a subcarrier spacing of the first transmission resource.

In an embodiment, the second wireless access technology may alternatively be a wireless access technology between a terminal and an access network device.

According to a thirteenth aspect, a communications device is provided. The communications device includes: one or more processors, a memory, and a communications interface. The memory and the communications interface are coupled to the one or more processors. The communications device communicates with another device through the communications interface. The memory is configured to store computer program code. The computer program code includes an instruction. When the one or more processors execute the instruction, the communications device performs the communication method according to any one of the eleventh aspect and the possible implementations of the eleventh aspect.

According to a fourteenth aspect, a computer-readable storage medium is further provided. The computer-readable storage medium stores an instruction. When the instruction is run on a communications device, the communications device is enabled to perform the communication method according to any one of the eleventh aspect and the possible implementations of the eleventh aspect.

According to a fifteenth aspect, a computer program product including an instruction is further provided. When the computer program product is run on a communications device, the communications device is enabled to perform the communication method according to any one of the eleventh aspect and the possible implementations of the eleventh aspect.

In this application, a name of the foregoing communications device does not constitute any limitation to devices or function modules. In an actual implementation, these devices or function modules may have other names. Provided that functions of the devices or the function modules are similar to those in this application, the devices or the function modules fall within the scope of the claims in this application and their equivalent technologies.

In this application, for detailed descriptions of the second aspect, the third aspect, the fourth aspect, the fifth aspect, and various implementations of the second aspect, the third aspect, the fourth aspect, and the fifth aspect, refer to the detailed descriptions of the first aspect and the implementations of the first aspect. In addition, for beneficial effects of the second aspect, the third aspect, the fourth aspect, the fifth aspect, and the various implementations of the second aspect, the third aspect, the fourth aspect, and the fifth aspect, refer to analysis of the beneficial effects of the first aspect and the implementations of the first aspect. Details are not described herein again.

These aspects or other aspects in this application are more concise and comprehensible in the following descriptions.

DESCRIPTION OF EMBODIMENTS

Figure 1:
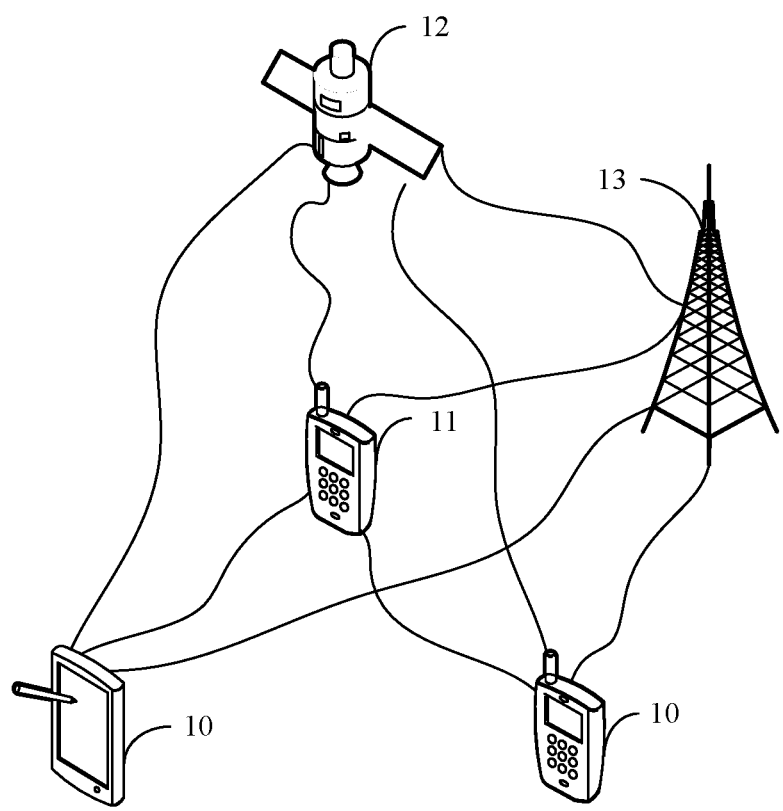
FIG. 1 is a first schematic structural diagram of a communications system according to an embodiment of this application.

Internet of vehicles refers to a system that provides vehicle information by using a sensor, an apparatus, a chip, a vehicle-mounted terminal, or an electronic label that is mounted on a vehicle, implements interconnection and interworking among V2V, V2P, and V2I communications technologies by using various communications technologies, effectively uses, for example, extracts or shares, information on an information network platform, effectively manages and controls the vehicle, and provides a comprehensive service.

The V2V, V2P, and V2I communications technologies may be collectively referred to as a V2X communications technology. A V2X communications technology in an LTE system includes Release 14 (Rel-14) and Release 15 (Rel-15).

Currently, a vehicle-mounted chip that supports the V2X communications technology in the LTE system has appeared in the market, and experiments, tests, and small-scale application are in progress. For a 5G system deployed in 2020, research on a V2X communications technology in the 5G system has also been started. Correspondingly, researchers need to consider coexistence of the V2X communications technology in the 5G system and the V2X communications technology in the LTE system. If the V2X communications technology in the 5G system and the V2X communications technology in the LTE system cannot coexist fairly, interference between the two systems occurs, reducing performance and transmission efficiency of the systems; and even messages transmitted between the two systems cannot be identified by each other. A scenario in which a communications module fails due to non-coexistence of the V2X communications technology in the LTE system and the V2X communications technology in the 5G system and therefore a major traffic accident occurs is unacceptable.

Currently, there is no method for achieving effective coexistence of the V2X communications technology in the LTE system and the V2X communications technology in the 5G system. To resolve this problem, the embodiments of this application provide a communication method. After obtaining a first carrier that can be used to transmit a first message and a second message, a first communications device obtains a first transmission resource used to send the first message and a second transmission resource used to send the second message on the first carrier, sends the first message on the first transmission resource by using a first wireless access technology, and sends the second message on the second transmission resource by using a second wireless access technology. Herein, the first transmission resource and the second transmission resource are different, and the first wireless access technology and the second wireless access technology are different inter-device direct communications technologies.

Because the first wireless access technology and a second access network technology are different, and the first transmission resource and the second transmission resource are different, the first communications device can send the first message on the first transmission resource by using the first wireless access technology, and can further send the second message on the second transmission resource by using the second wireless access technology, to achieve coexistence of two different types of services. Correspondingly, if the first wireless access technology is a V2X communications technology in a 5G system, and the second wireless access technology is a V2X communications technology in an LTE system, effective coexistence of the V2X communications technology in the LTE system and the V2X communications technology in the 5G system can be achieved by using the communication method provided in this application.

The communication method provided in the embodiments of this application is applicable to a communications system, and the communications system supports transmission of different types of service data.

FIG. 1 is a schematic structural diagram of a communications system according to an embodiment of this application. Referring to FIG. 1, the communications system includes a remote device 10, a relay device 11, and a global navigation satellite system (GNSS) 12. The remote device 10 may communicate with the GNSS 12 via the relay device 11, or may directly communicate with the GNSS 12.

A connection between the remote device 10 and the relay device 11 may be a 3GPP connection, or may be a non-3GPP connection. The 3GPP connection may be implemented by a device-to-device (D2D)/V2X communications technology. The non-3GPP connection may be implemented by any one of wireless short-range communications technologies such as Bluetooth (BT), wireless fidelity (Wi-Fi), near field communication (NFC), and infrared. This is not limited in the embodiments of this application.

The remote device 10 in this embodiment of this application may be a terminal such as a smart water meter or a smart electricity meter in an internet of things, or may be a vehicle-mounted terminal mounted on a vehicle in an internet of vehicles, or may be an intelligent wearable device such as a wearable device (WD).

The relay device 11 in this embodiment of this application is a terminal having a relay attribute. The terminal is a wireless terminal that can provide various available network connection capabilities such as D2D, BT, Wi-Fi, NFC, and infrared.

In an embodiment, the communications system shown in FIG. 1 may further include a base station 13.

The base station 13 may be a next generation LTE base station (Next Generation eNB, ng-eNB), or may be a gNB (e.g., a base station in the 5G system). This is not limited in this embodiment of this application. The ng-eNB may provide a wireless transmission resource for the terminal by using an evolved universal terrestrial radio access (E-UTRA) technology, or may provide a service of a 5th generation core network (5GCN) for the terminal.

The base station 13 may serve the remote device 10 and/or the relay device 11. The base station 13 may further communicate with the GNSS 12. The remote device 10 may communicate with the base station 13 via the relay device 11, or may directly communicate with the base station 13. In an actual application, a base station serving the remote device 10 may be the same as or different from a base station serving the relay device 11.

In an embodiment, when the communications system is applied to an internet of vehicles scenario, the communications system may further include a road side unit (RSU) 14. The RSU 14 may communicate with the remote device 10, the relay device 11, and the base station 13. The RSU 14 may have a function of a vehicle-mounted terminal mounted on a vehicle, or may have a function of a base station.

Any device in FIG. 1 can support transmission of LTE service data and 5G service data.

In an actual application, connections among the foregoing plurality of devices are wireless connections. Solid lines are used in FIG. 1 to conveniently and intuitively represent connection relationships among the devices.

It should be noted that FIG. 1 shows, for description, merely an example of the communications system provided in the embodiments of this application, and does not limit the communications system. In an actual application, the communications system may alternatively include at least one relay device, at least one RSU, and at least one base station.

Figure 2:
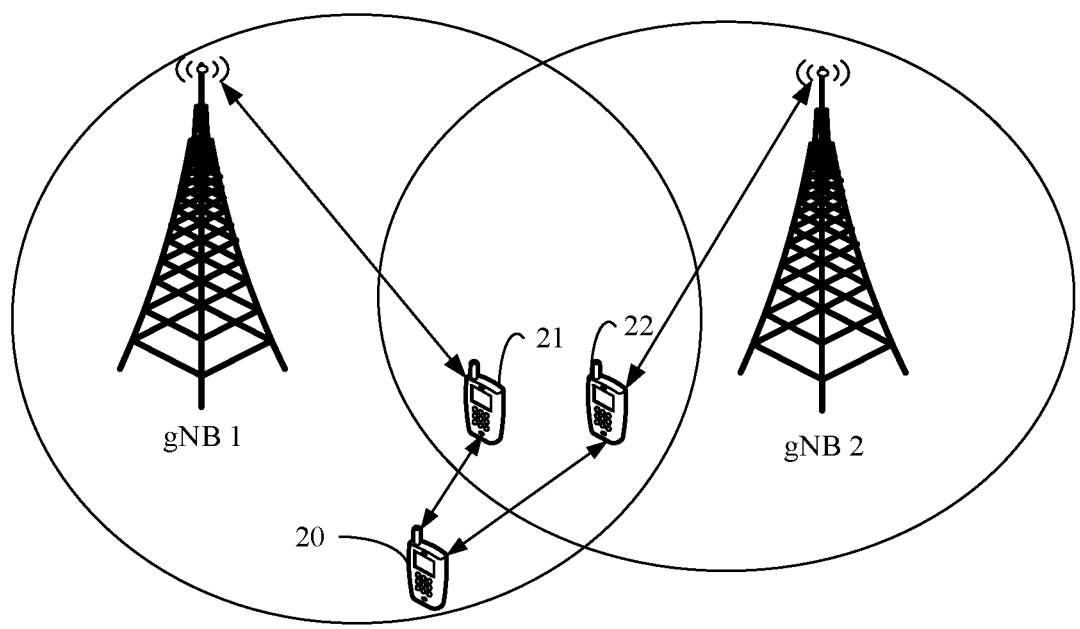
FIG. 2 is a first schematic diagram of an application scenario according to this application.

In a scenario in which the communications system in this application includes a base station, a remote device may be located within network coverage of the base station, and directly establishes a radio resource control (RRC) connection to the base station or receives a broadcast message sent by the base station. However, when data is transmitted between the remote device and the base station, the data needs to be forwarded by a relay device. For example, with reference to FIG. 1, as shown in FIG. 2, a remote device 20 is located within network coverage of a base station gNB 1, and may transmit data with the gNB 1 via a relay device 21, and transmit data with a gNB 2 via a relay device 22.

Figure 3:
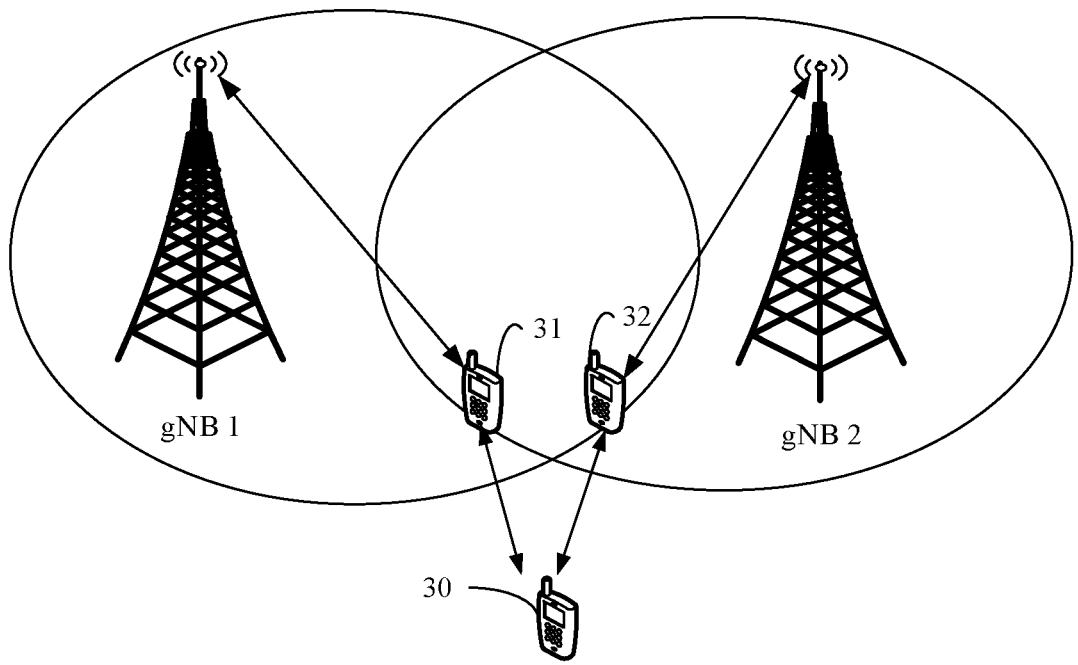
FIG. 3 is a second schematic diagram of an application scenario according to this application.

In addition, a remote device may alternatively be located outside the network coverage of the base station, and receives a signal sent by a relay device within the network coverage of the base station. For example, with reference to FIG. 1, as shown in FIG. 3, a remote device 30 is located outside network coverage of a gNB 1 and a gNB 2, and may receive both signals sent by a relay device 31 and a relay device 32 that are respectively within the network coverage of the gNB 1 and the gNB 2.

Figure 4:
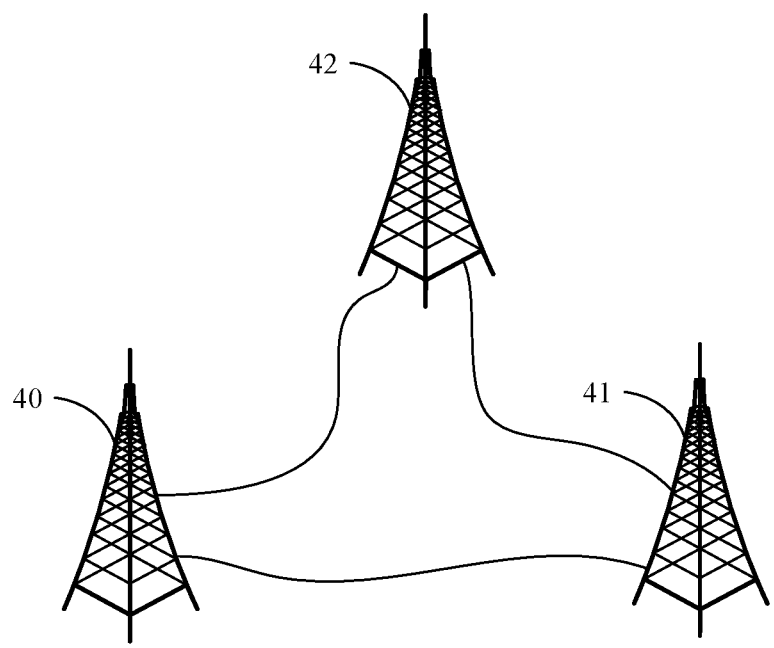
FIG. 4 is a second schematic structural diagram of a communications system according to an embodiment of this application.

FIG. 4 is another schematic structural diagram of a communications system according to an embodiment of this application. Referring to FIG. 4, the communications system includes a base station 40, a base station 41, and a base station 42. The base station 40 is connected to both the base station 41 and the base station 42, and the base station 41 is also connected to both the base station 40 and the base station 42. The base station 41, the base station 40, and the base station 42 may all be macro base stations, or may all be micro base stations, or some may be macro base stations and the other may be micro base stations. Any base station in FIG. 4 can support transmission of LTE service data and 5G service data.

Similarly, in an actual application, connections among the foregoing base stations are wireless connections. Solid lines are used in FIG. 4 to conveniently and intuitively represent connection relationships among the base stations.

It should be noted that FIG. 4 shows, for description, merely an example of the communications system provided in the embodiments of this application, and does not limit the communications system. In an actual application, each base station may further serve at least one terminal.

The remote device and the relay device in the embodiments of this application each may be a terminal that can implement data transmission with the base station on a control plane and a user plane. The terminal may be a mobile phone (a mobile phone 300 shown in FIG. 5), a tablet computer, a personal computer (PC), a personal digital assistant (PDA), a smartwatch, a netbook, a wearable electronic device, or the like.

Figure 5:
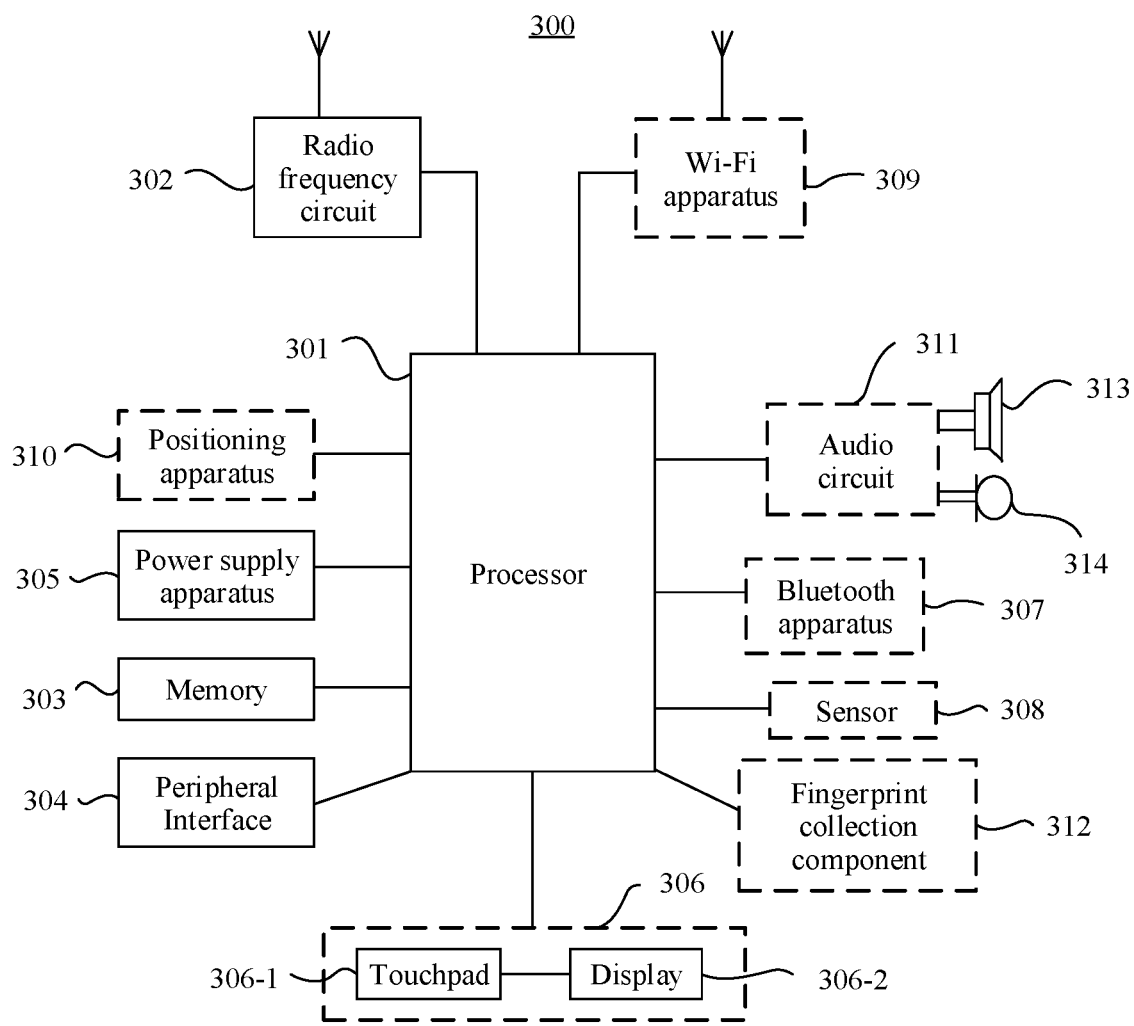
FIG. 5 is a schematic diagram of a hardware structure of a mobile phone according to an embodiment of this application.

As shown in FIG. 5, the mobile phone 300 is used as an example of the foregoing terminal. The mobile phone 300 may include: a processor 301, a radio frequency (RF) circuit 302, a memory 303, a peripheral interface 304, and a power supply apparatus 305. In an embodiment, the mobile phone 300 may further include components such as a touchscreen 306, a Bluetooth apparatus 307, one or more sensors 308, a Wi-Fi apparatus 309, a positioning apparatus 310, and an audio circuit 311. These components may communicate with each other via one or more communications buses or signal cables (not shown in FIG. 5).

The touchscreen 306, the Bluetooth apparatus 307, the one or more sensors 308, the wireless fidelity (Wi-Fi) apparatus 309, the positioning apparatus 310, and the audio circuit 311 are optional components, and therefore are represented by dashed-line boxes in FIG. 5.

The following describes in detail the components of the mobile phone 300 with reference to FIG. 5.

The processor 301 is a control center of the mobile phone 300, is connected to all parts of the mobile phone 300 via various interfaces and lines, and performs various functions of the mobile phone 300 and processes data by running or executing an application program stored in the memory 303 and invoking data stored in the memory 303. In some embodiments, the processor 301 may include one or more processing units. In some embodiments of this application, the processor 301 may further include a fingerprint verification chip, configured to verify a collected fingerprint.

The radio frequency circuit 302 may be configured to receive and send a radio signal in an information receiving/sending process or a call process. Particularly, after receiving downlink data from a base station, the radio frequency circuit 302 may send the downlink data to the processor 301 for processing, and sends related uplink data to the base station. Generally, a radio frequency circuit includes but is not limited to an antenna, at least one amplifier, a transceiver, a coupler, a low noise amplifier, a duplexer, and the like. In addition, the radio frequency circuit 302 may further communicate with another device through wireless communication. The wireless communication may use any communication standard or protocol, including but not limited to global system for mobile communications, general packet radio service, code division multiple access, wideband code division multiple access, long term evolution, email, SMS message service, and the like.

The memory 303 is configured to store the application program and the data. The processor 301 performs various functions of the mobile phone 300 and processes data by running the application program and the data that are stored in the memory 303. The memory 303 mainly includes a program storage area and a data storage area. The program storage area may store an operating system, and an application program used for at least one function (for example, a sound playing function or an image processing function). The data storage area may store data (for example, audio data or a phone book) created based on use of the mobile phone 300.

In addition, the memory 303 may include a high-speed random access memory (RAM), and may further include a non-volatile memory such as a magnetic disk storage component, a flash memory, or another volatile solid-state storage component. The memory 303 may store various operating systems such as an iOS operating system and an Android operating system. The memory 303 may be stand-alone, and is connected to the processor 301 via the communications bus; or the memory 303 may be integrated with the processor 301.

The peripheral interface 304 is configured to provide various interfaces for an external input/output device (for example, a keyboard, a mouse, an external display, an external memory, or a subscriber identification module card). For example, the peripheral interface 304 is connected to the mouse through a universal serial bus (USB) interface, and is connected, through a metal contact on a card slot of the subscriber identification module (SIM) card, to the subscriber identification module card provided by a telecommunications operator. The peripheral interface 304 may be configured to couple the external input/output peripheral device to the processor 301 and the memory 303.

The power supply apparatus 305 is configured to supply power to the components of the mobile phone 300. The power supply apparatus 305 may be a battery and a power management chip. The battery may be logically connected to the processor 301 via the power management chip, to implement functions such as charging management, discharging management, and power consumption management via the power supply apparatus 305.

The touchscreen 306 may include a touchpad 306-1 and a display 306-2.

The touchpad 306-1 may collect a touch event performed by a user of the mobile phone 300 on or near the touchpad 306-1 (for example, an operation performed by the user on or near the touchpad 306-1 by using any proper object such as a finger or a stylus), and send collected touch information to another component (for example, the processor 301). The touch event performed by the user near the touchpad 306-1 may be referred to as a floating touch. The floating touch may mean that a user does not need to directly touch a touchpad to select, move, or drag an object (for example, an icon), and instead, the user only needs to be near a device to perform a desired function. In addition, the touchpad 306-1 may be implemented in a plurality of types such as a resistive type, a capacitive type, an infrared type, and a surface acoustic wave type.

The display (also referred to as a display) 306-2 may be configured to display information entered by the user or information provided for the user, and various menus of the mobile phone 300. The display 306-2 may be configured in a form such as a liquid crystal display or an organic light-emitting diode. The touchpad 306-1 may cover the display 306-2. After detecting the touch event on or near the touchpad 306-1, the touchpad 306-1 transfers the touch event to the processor 301 to determine a type of the touch event. Then, the processor 301 may provide corresponding visual output on the display 306-2 based on the type of the touch event. Although the touchpad 306-1 and the display 306-2 in FIG. 5 are used as two independent components to implement input and output functions of the mobile phone 300, in some embodiments, the touchpad 306-1 and the display 306-2 may be integrated to implement the input and output functions of the mobile phone 300. It may be understood that the touchscreen 306 is formed by stacking a plurality of layers of materials. In this embodiment of this application, only the touchpad (layer) and the display (layer) are displayed, and another layer is not set forth in this embodiment of this application. In addition, the touchpad 306-1 may be disposed on a front face of the mobile phone 300 in a form of a full panel, and the display 306-2 may also be disposed on the front face of the mobile phone 300 in a form of a full panel. In this way, a bezel-less structure can be implemented for the front face of the mobile phone.

In an embodiment, the mobile phone 300 may further have a fingerprint recognition function. For example, a fingerprint collection component 312 may be disposed on a back face (for example, below a rear-facing camera) of the mobile phone 300, or may be disposed on the front face (for example, below the touchscreen 306) of the mobile phone 300. For another example, a fingerprint collection component 312 may be disposed on the touchscreen 306 to implement the fingerprint recognition function. In other words, the fingerprint collection component 312 may be integrated with the touchscreen 306 to implement the fingerprint recognition function of the mobile phone 300. In this case, the fingerprint collection component 312 is disposed on the touchscreen 306, and may be a part of the touchscreen 306; or may be disposed on the touchscreen 306 in another manner. A main part of the fingerprint collection component 312 in this embodiment of this application is a fingerprint sensor. The fingerprint sensor may use any type of sensing technology, including but not limited to an optical sensing technology, a capacitive sensing technology, a piezoelectric sensing technology, an ultrasonic sensing technology, or the like.

The Bluetooth apparatus 307 is configured to implement data exchange between the mobile phone 300 and another short-range device (such as a mobile phone or a smartwatch). In this embodiment of this application, the Bluetooth apparatus may be an integrated circuit, a Bluetooth chip, or the like.

The mobile phone 300 may further include at least one type of sensor 308, such as a light sensor, a motion sensor, and another sensor. Specifically, the light sensor may include an ambient light sensor and a proximity sensor. The ambient light sensor may adjust luminance of the display of the touchscreen 306 based on intensity of ambient light. The proximity sensor may power off the display when the mobile phone 300 is moved to the ear. As one type of the motion sensor, an accelerometer sensor may detect a value of acceleration in each direction (usually on three axes). The accelerometer sensor may detect a value and a direction of gravity when the accelerometer sensor is stationary, and may be applied to an application for identifying a mobile phone posture (such as screen switching between a landscape mode and a portrait mode, a related game, or magnetometer posture calibration), a function related to vibration recognition (such as a pedometer or a knock), and the like. For another sensor such as a gyroscope, a barometer, a hygrometer, a thermometer, or an infrared sensor that may be further disposed in the mobile phone 300, details are not described herein.

The Wi-Fi apparatus 309 is configured to provide, for the mobile phone 300, network access that complies with a Wi-Fi-related standard protocol. The mobile phone 300 may access a Wi-Fi access point through the Wi-Fi apparatus 309, to help the user send and receive an email, browse a web page, access streaming media, and so on. The Wi-Fi apparatus 309 provides wireless broadband internet access for the user. In some other embodiments, the Wi-Fi apparatus 309 may also be used as a Wi-Fi wireless access point, and may provide Wi-Fi network access for another device.

The positioning apparatus 310 is configured to provide a geographical location for the mobile phone 300.

It may be understood that the positioning apparatus 310 may be a receiver of a positioning system such as a global positioning system (GPS), a BeiDou navigation satellite system, or a Russian GLONASS. After receiving a geographic location sent by the positioning system, the positioning apparatus 310 sends the information to the processor 301 for processing, or sends the information to the memory 303 for storage.

In some other embodiments, the positioning apparatus 310 may alternatively be a receiver of an assisted global positioning system (AGPS). The AGPS system serves as an assisted server to assist the positioning apparatus 310 in completing ranging and positioning services. In this case, the assisted positioning server communicates with the positioning apparatus 310 (namely, a GPS receiver) of a device such as the mobile phone 300 through a wireless communications network, to provide positioning assistance.

In some other embodiments, the positioning apparatus 310 may alternatively be a positioning technology based on a Wi-Fi access point. Each Wi-Fi access point has a globally unique MAC address, and a device may scan and collect a broadcast signal of a surrounding Wi-Fi access point when Wi-Fi is enabled. Therefore, the device may obtain a MAC address broadcast by the Wi-Fi access point. The device sends, to a location server through the wireless communications network, data (for example, the MAC address) that can identify the Wi-Fi access point. The location server obtains a geographical location of each Wi-Fi access point through retrieval, calculates a geographical location of the device with reference to strength of the Wi-Fi broadcast signal, and sends the geographical location of the device to the positioning apparatus 310 of the device.

The audio circuit 311, a speaker 313, and a microphone 314 may provide an audio interface between the user and the mobile phone 300. The audio circuit 311 may convert received audio data into an electrical signal and then send the electrical signal to the speaker 313, and the speaker 313 converts the electrical signal into a sound signal for output. In addition, the microphone 314 converts a collected sound signal into an electrical signal. The audio circuit 311 receives the electrical signal, converts the electrical signal into audio data, and then outputs the audio data to the RF circuit 302, to send the audio data to, for example, another mobile phone, or outputs the audio data to the memory 303 for further processing.

Although not shown in FIG. 5, a camera (a front-facing camera and/or the rear-facing camera), a flash, a micro projection apparatus, an NFC apparatus, and the like may be further included in the mobile phone 300. Details are not described herein.

A person skilled in the art may understand that the hardware structure shown in FIG. 5 does not constitute a limitation on the mobile phone, and the mobile phone 300 may include more or fewer components than those shown in the figure, or some components may be combined, or the mobile phone 300 may have different component arrangements.

Figure 6:
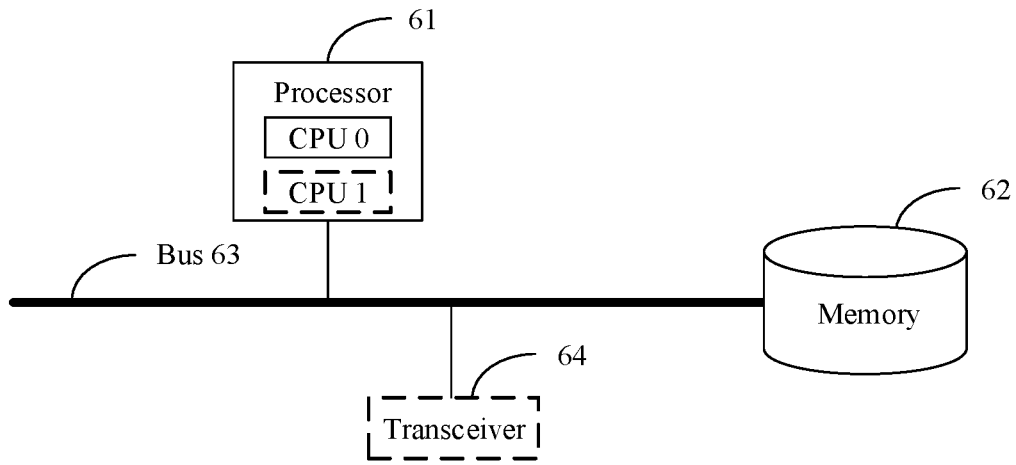
FIG. 6 is a schematic diagram of a hardware structure of a base station according to an embodiment of this application.

FIG. 6 shows a composition structure of a base station (gNB/ng-eNB) according to an embodiment of this application. As shown in FIG. 6, the base station may include a processor 61, a memory 62, and a bus 63.

The components of the base station are described in detail below with reference to FIG. 6.

The processor 61 is a control center of the base station, and may be one processor, or may be a general term of a plurality of processing elements. For example, the processor 61 is a CPU, or may be an application-specific integrated circuit (ASIC), or one or more integrated circuits configured to implement the embodiments of this application, such as one or more microprocessors (DSP) or one or more field programmable gate arrays (FPGA).

The processor 61 may perform various functions of the base station by running or executing a software program stored in the memory 62 and invoking data stored in the memory 62.

During specific implementation, in an embodiment, the processor 61 may include one or more CPUs, for example, a CPU 0 and a CPU 1 shown in the figure. The processor 61 may be a single-core (single-CPU) processor or may be a multi-core (multi-CPU) processor. The processor herein may refer to one or more devices, circuits, and/or processing cores configured to process data (for example, a computer program instruction).

The memory 62 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray optical disc, or the like), a magnetic disk storage medium or another magnetic storage device, or any other medium that can be used to carry or store expected program code in a form of an instruction or a data structure and that can be accessed by a computer. However, the memory 62 is not limited thereto. The memory 62 may exist independently, and may be connected to the processor 61 via the bus 63. The memory 62 may alternatively be integrated with the processor 61.

The memory 62 is configured to store a software program for executing the solutions of this application, and the processor 61 controls the execution.

The bus 63 may be an industry standard architecture (ISA) bus, a peripheral component interconnect (Peripheral Component Interconnect, PCI) bus, an extended industry standard architecture (EISA) bus, or the like. The bus may be classified into an address bus, a data bus, a control bus, and the like. For ease of representation, only one thick line is used to represent the bus in FIG. 6, but this does not mean that there is only one bus or only one type of bus.

In an embodiment, the base station further includes a transceiver 64. The transceiver 64 is configured to communicate with another device or a communications network under control of the processor 61, for example, configured to communicate with a communications network such as the Ethernet, a radio access network (RAN), or a wireless local area network (WLAN). The transceiver 64 may include a part or an entirety of a baseband processor, and may further include an RF processor. The RF processor is configured to send and receive an RF signal. The baseband processor is configured to process a baseband signal converted from the RF signal or a baseband signal to be converted into the RF signal.

The transceiver 64 is optional, and therefore is represented by a dashed line in FIG. 6.

The device structure shown in FIG. 6 does not constitute a limitation on the base station. The base station may include more or fewer components than those shown in the figure, or some components may be combined, or the base station may have different component arrangements.

The following describes in detail the communication method provided in this application with reference to the communications system shown in FIG. 1, the communications system shown in FIG. 4, the mobile phone 300 shown in FIG. 5, and the base station shown in FIG. 6.

Figure 7:
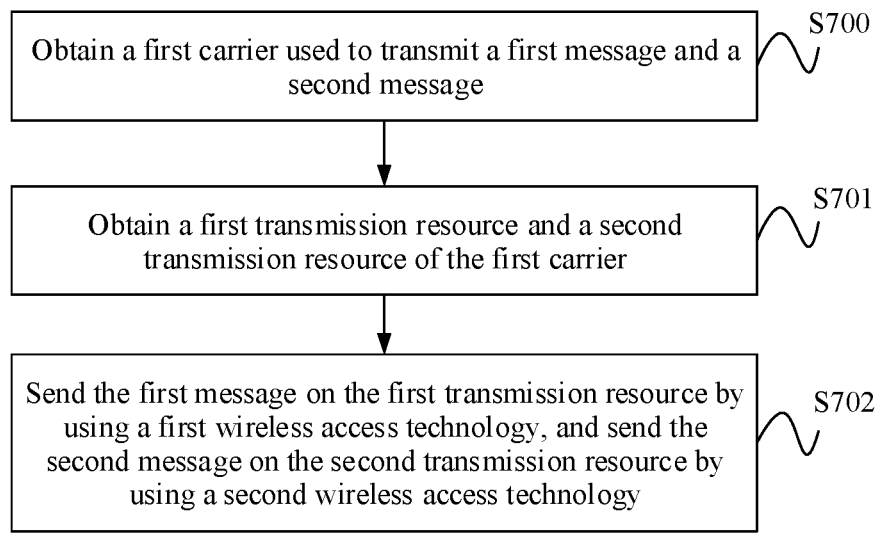
FIG. 7 is a first schematic flowchart of a communication method according to an embodiment of this application.

FIG. 7 is a schematic flowchart of a communication method according to an embodiment of this application. The communication method may be applied to the communications system shown in FIG. 1 or FIG. 4.

A procedure shown in FIG. 7 is described by using an example in which the procedure is performed by a first communications device. The first communications device is a transmit-end device, and may be the remote device, the relay device, the RSU, or the base station above, or certainly may be a chip in any one of the foregoing devices. This is not limited in this embodiment of this application.

As shown in FIG. 7, the communication method provided in this embodiment of this application includes the following operations.

S700. The first communications device obtains a first carrier used to transmit a first message and a second message.

Herein, the first message or the second message may be a message including control information, or may be a parameter signal, or may be another type of message. This is not limited in this embodiment of this application.

In this embodiment of this application, the first message is transmitted by using a first wireless access technology, the second message is transmitted by using a second wireless access technology, and the first wireless access technology and the second wireless access technology are different inter-device direct communications technologies. For example, the first wireless access technology is an inter-device direct communications technology in a next-generation access network (NR), that is, a V2X communications technology in a 5G system; and the second wireless access technology is a V2X communications technology in an LTE system.

In an inter-device direct communications technology, a link between devices may be referred to as a D2D link, and may also be referred to as a sidelink. Transmission between different devices on the D2D link/sidelink may be performed in any one of a broadcast mode, a multicast mode, or a unicast mode. This is not limited in this embodiment of this application.

In addition, the second wireless access technology in this embodiment of this application may alternatively be a wireless access technology between a terminal and an access network device (such as a base station).

If the first wireless access technology is an inter-device direct communications technology in NR, and the second wireless access technology is a wireless access technology between a terminal and an access network device, the communication method provided in this application is applicable to achievement of sharing/coexistence of transmission resources on a cellular link.

The first carrier in this embodiment of this application may be preconfigured, or may be indicated by a network device by using carrier configuration indication information. This is not limited in this embodiment of this application. If the first carrier is preconfigured, the first communications device directly determines the first carrier. If the first carrier is indicated by the network device by using the carrier configuration indication information, the first communications device receives, from the network device, the carrier indication information used to indicate the first carrier, and obtains the first carrier according to the carrier indication information.

S701. The first communications device obtains a first transmission resource and a second transmission resource of the first carrier.

It is easily understood that because the first carrier is used to transmit the first message and the second message, and the first communications device transmits the first message and the second message by using different wireless access technologies, the first message and the second message may be carried on different transmission resources.

In an embodiment of this application, a transmission resource for sending the first message is the first transmission resource, a transmission resource for sending the second message is the second transmission resource, and the first transmission resource and the second transmission resource are different.

A subcarrier spacing of the first transmission resource and a subcarrier spacing of the second transmission resource are independent of each other. In other words, the subcarrier spacing of the first transmission resource and the subcarrier spacing of the second transmission resource may be separately configured or separately defined. In an actual application, the subcarrier spacing of the first transmission resource and the subcarrier spacing of the second transmission resource may be equal or not equal.

In addition, the first transmission resource and the second transmission resource have a same radio frame number in time domain. For example, a direct frame number (DFN) of the first transmission resource is the same as that of the second transmission resource. Alternatively, there is a preset deviation value between a radio frame number of the first transmission resource and a radio frame number of the second transmission resource in time domain. The preset deviation value may be predefined, or may be indicated by the network device by using signaling. For example, the preset deviation value is N times a slot length of the first transmission resource, where N is a positive integer.

Because the first transmission resource and the second transmission resource have a same radio frame number in time domain, or there is a preset deviation value between the radio frame number of the first transmission resource and the radio frame number of the second transmission resource in time domain, in this embodiment of this application, timings of the first transmission resource and the second transmission resource may be aligned in the unit of radio frames. In this way, a resource waste caused by multiplexing the first transmission resource and the second transmission resource in time domain can be reduced. For example, if a radio frame number of first transmission is not aligned with a radio frame number of second transmission, timings of the first transmission and the second transmission partially overlap in terms of time, and orthogonal multiplexing of the first transmission resource and the second transmission resource cannot be implemented on an overlapping part of the resources, causing a resource waste.

Slot duration (namely, a slot length) in this embodiment of this application is most-basic duration occupied by one transmission. The slot length may be predefined, and for example, is one millisecond, 0.5 millisecond, 0.25 millisecond, or 0.125 millisecond. Alternatively, the slot length may be determined based on duration of a reference slot and a subcarrier spacing in an actual transmission process.

When the subcarrier spacing of the first transmission resource is greater than the subcarrier spacing of the second transmission resource, the slot length of the first transmission resource is less than a slot length of the second transmission resource. For example, if the first transmission resource is used to transmit service data of the V2X communications technology in the 5G system and has a subcarrier spacing of 30 kHz or 60 kHz, and the second transmission resource is used to transmit service data of the V2X communications technology in the LTE system and has a subcarrier spacing of 15 kHz, the slot length of the first transmission resource is less than the slot length of the second transmission resource.

In an embodiment, the first transmission resource and the second transmission resource both belong to a same resource pool of the first carrier. For example, the first transmission resource and the second transmission resource both belong to a first resource pool. In this case, optionally, the first transmission resource and the second transmission resource are orthogonal to each other. Herein, "orthogonal" means that occupied frequency domain resources are different. For example, a subcarrier, a physical resource block, or a subchannel occupied by the first resource pool, or a bandwidth part on a carrier occupied by the first resource pool is different from that occupied by a second resource pool. In this case, orthogonal transmission without mutual interference can be implemented between a V2X service, in the 5G system, on the first transmission resource and a V2X service, in the LTE system, on the second transmission resource, thereby achieving fair coexistence of the two types of services.

In another embodiment, the first transmission resource and the second transmission resource belong to different resource pools of the first carrier. For example, the first transmission resource belongs to a second resource pool, and the second transmission resource belongs to a third resource pool. In this case, optionally, the second resource pool and the third resource pool are orthogonal to each other.

Figure 8:
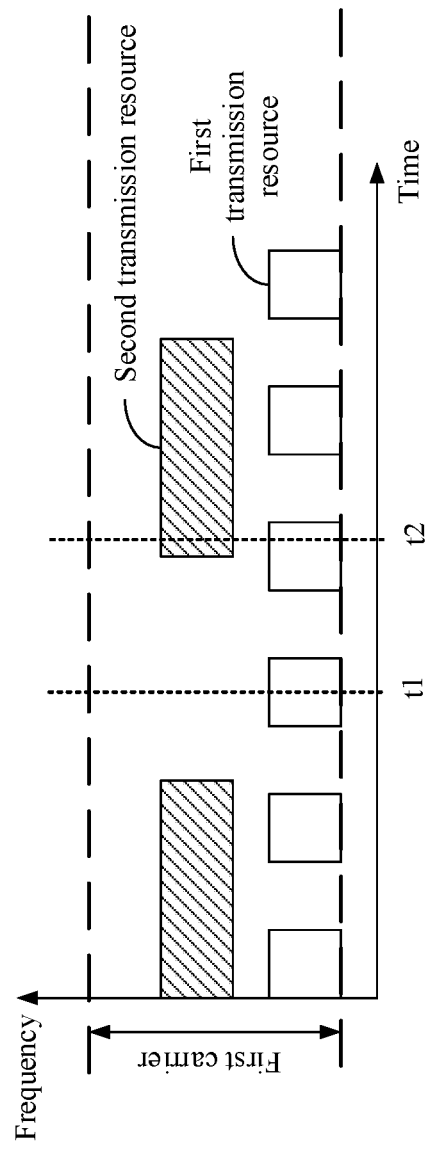
FIG. 8 is a first schematic structural diagram of a first transmission resource and a second transmission resource according to an embodiment of this application.
Figure 9A:
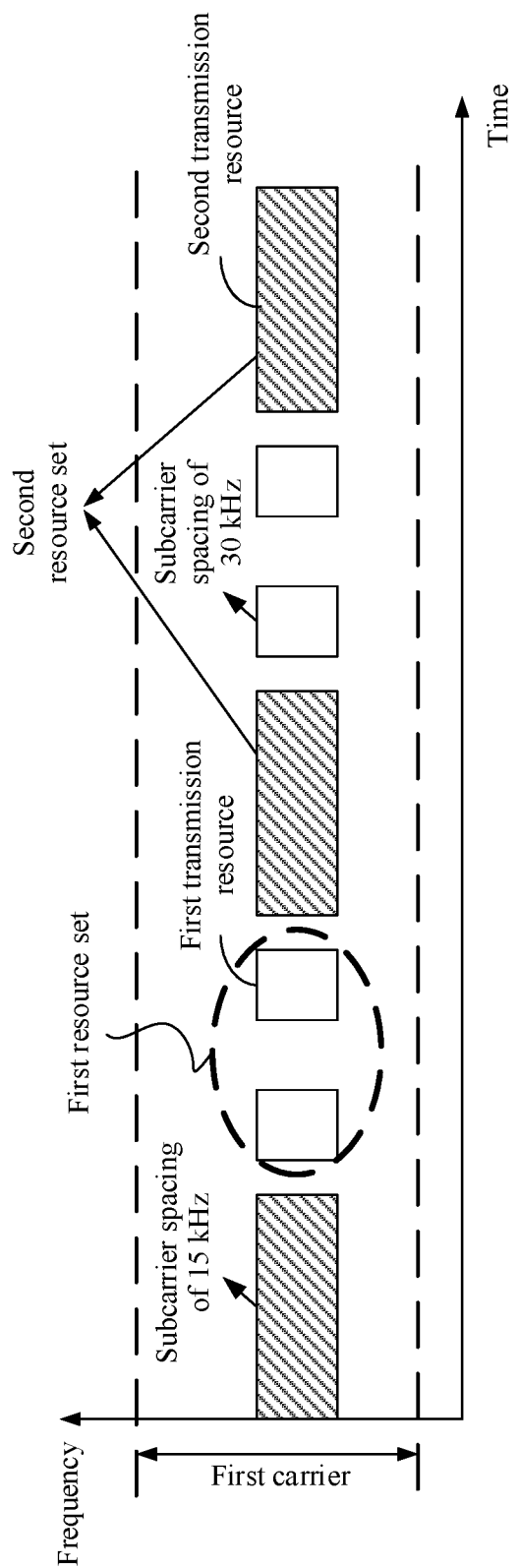
FIG. 9A is a second schematic structural diagram of a first transmission resource and a second transmission resource according to an embodiment of this application.
Figure 9B:
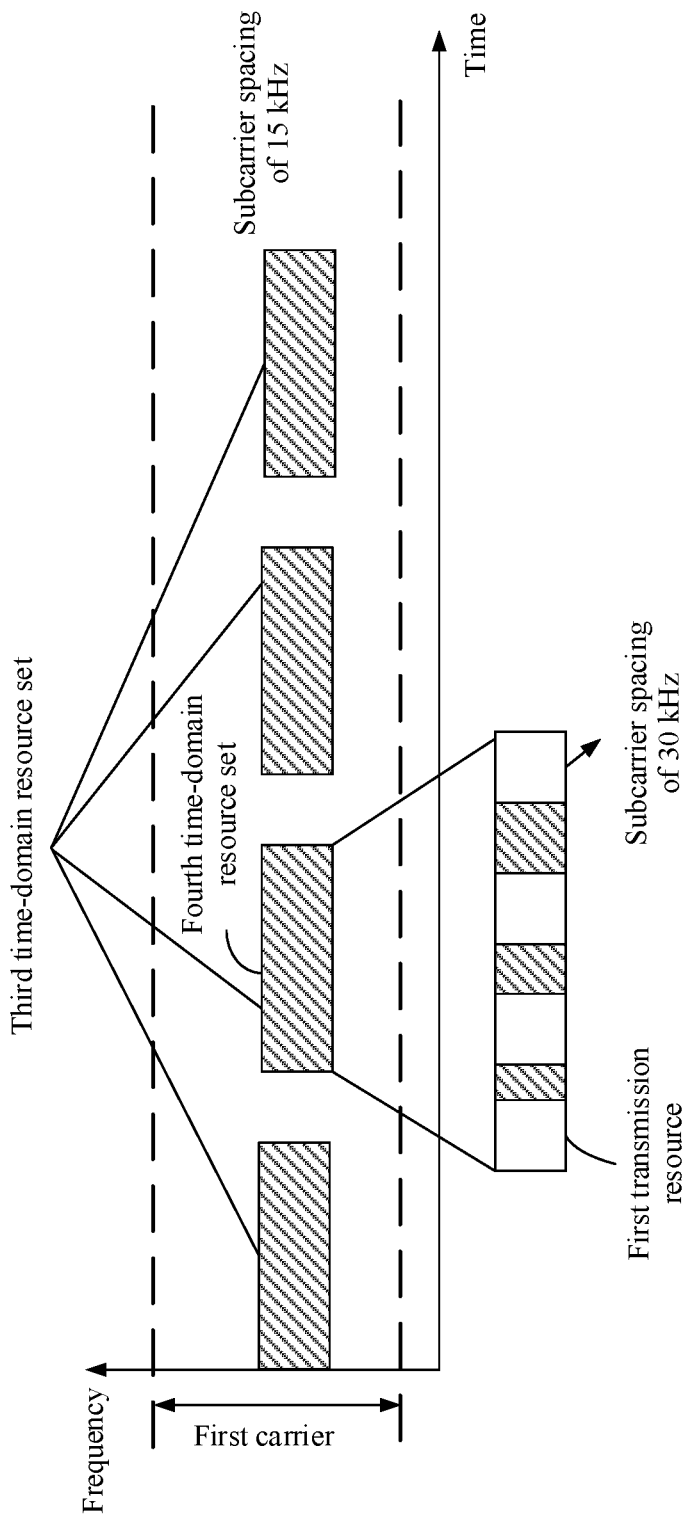
FIG. 9B is a third schematic structural diagram of a first transmission resource and a second transmission resource according to an embodiment of this application.

In an embodiment, the first communications device may occupy the first transmission resource and the second transmission resource in an FDM mode (as shown in FIG. 8), or may occupy the first transmission resource and the second transmission resource in a TDM mode (as shown in FIG. 9A or FIG. 9B). This is not limited in this embodiment of this application.

In an embodiment, in a scenario in which the first communications device occupies the first transmission resource and the second transmission resource in the TDM mode, a method for obtaining the first transmission resource of the first carrier by the first communications device may be: The first communications device obtains a first resource set of the first carrier, where a time-domain resource unit of the first resource set is determined based on the subcarrier spacing of the first transmission resource. In this way, the first communications device can obtain the first transmission resource from the first resource set based on first configuration information, where the first configuration information is used to indicate at least one time-domain resource unit in the first resource set. The first configuration information is preconfigured or is indicated by second signaling sent by the network device.

In an embodiment, in the scenario in which the first communications device occupies the first transmission resource and the second transmission resource in the TDM mode, a method for obtaining the second transmission resource of the first carrier by the first communications device may be: The first communications device obtains a second resource set of the first carrier, where a time-domain resource unit of the second resource set is determined based on the subcarrier spacing of the second transmission resource. In this way, the first communications device can obtain the second transmission resource from the second resource set based on second configuration information, where the second configuration information is used to indicate at least one time-domain resource unit in the second resource set. The second configuration information is preconfigured or is indicated by third signaling sent by the network device.

In an embodiment, the time-domain resource unit may be simply understood as a slot.

As shown in FIG. 9A, if the subcarrier spacing of the first transmission resource is 30 kHz, and the subcarrier spacing of the second transmission resource is 15 kHz, the first communications device obtains the first resource set based on signaling sent by the network device or a preconfiguration, and obtains the first transmission resource from the first resource set based on the first configuration information. In addition, the first communications device obtains the second resource set based on signaling sent by the network device or a preconfiguration, and obtains the second transmission resource from the second resource set based on the second configuration information.

In an embodiment, in a scenario in which the first communications device occupies the first transmission resource and the second transmission resource in the TDM mode, a method for obtaining the first transmission resource of the first carrier by the first communications device may alternatively be: The first communications device obtains a third resource set and a fourth resource set, where the fourth resource set is a subset of the third resource set, a time-domain resource unit of the third resource set is determined based on the subcarrier spacing of the second transmission resource, and a time-domain resource unit of the fourth resource set is determined based on the subcarrier spacing of the first transmission resource. In this way, the first communications device obtains the first transmission resource from the fourth resource set based on third configuration information, where the third configuration information is used to indicate at least one time-domain resource unit in the fourth resource set. Herein, the third configuration information is preconfigured or is indicated by fourth signaling sent by the network device. In other words, the first communications device first determines the fourth resource set in the third resource set, and then determines the first transmission resource in the fourth resource set. Because the third resource set is determined based on the subcarrier spacing of the second transmission resource, the subcarrier spacing of the second transmission resource may be understood as a reference subcarrier spacing. In this case, the first communications device may obtain the second transmission resource based on fourth configuration information, where the fourth configuration information is preconfigured or is indicated by fifth signaling sent by the network device.

As shown in FIG. 9B, if the subcarrier spacing of the second transmission resource is a reference subcarrier spacing and is 30 kHz, and the subcarrier spacing of the first transmission resource is 15 kHz, the first communications device obtains the third resource set and the fourth resource set based on signaling sent by the network device or a preconfiguration, and obtains the first transmission resource from the fourth resource set based on the third configuration information.

It should be noted that the first communications device may first determine the second transmission resource and then determine the first transmission resource, or may first determine the first transmission resource and then determine the second transmission resource, or may determine the first transmission resource and the second transmission resource at the same time. This is not limited in this embodiment of this application.

S702. The first communications device sends the first message on the first transmission resource by using the first wireless access technology, and sends the second message on the second transmission resource by using the second wireless access technology.

After obtaining the first transmission resource, the first communications device sends the first message on the first transmission resource by using the first wireless access technology. After obtaining the second transmission resource, the first communications device sends the second message on the second transmission resource by using the second wireless access technology.

It can be learned from the foregoing descriptions that the first transmission resource and the second transmission resource are different transmission resources on the first carrier. Generally, different transmission resources correspond to different transmit powers. Therefore, the first communications device may send the first message on the first transmission resource at a first transmit power and by using the first wireless access technology, and send the second message on the second transmission resource at a second transmit power and by using the second wireless access technology. The transmit power in this application is a power consumed by the first communications device to send a message on the first transmission resource or the second transmission resource.

A sum of the first transmit power and the second transmit power is less than or equal to a configured power. Herein, the configured power may be a maximum transmit power or a maximum available transmit power of the first communications device, or may be a maximum transmit power or a maximum available transmit power on all carriers in a current subframe, or may be a maximum transmit power or a maximum available transmit power on a current carrier in a current subframe, or may be a maximum transmit power configured or indicated on a current channel (a data channel/a control channel). In addition, the configured power may alternatively be predefined, or may be configured by a base station by using signaling. This is not limited in this embodiment of this application.

In an embodiment, the first transmit power is determined by the first communications device based on a priority of the first message, and the second transmit power is determined by the first communications device based on a priority of the second message. Alternatively, the first transmit power or the second transmit power is configured by the network device by using signaling, or is preconfigured.

It is easily understood that, in a scenario in which the first communications device occupies the first transmission resource and the second transmission resource in the FDM mode, if the first communications device does not transmit the second message but transmits the first message in a slot (or there is the first transmission resource but no second transmission resource in a slot), the first transmit power may be equal to the configured power. If the first communications device transmits both the first message and the second message in a slot (or there is the first transmission resource and the second transmission resource in a slot), the first communications device may determine the first transmit power based on the priority of the first message, and determine the second transmit power based on the priority of the second message.

As shown in FIG. 8, the first communications device transmits the first message but does not transmit the second message at a moment t1. In this case, the first transmit power is the configured power, and the second transmit power is 0 at this moment. The first communications device transmits the first message and the second message at a moment t2. In this case, the first transmit power and the second transmit power are both less than the configured power at this moment, and the sum of the first transmit power and the second transmit power is less than the configured power.

In an embodiment, the priority of the first message or the priority of the second message may be predefined, or may be configured by the network device. For example, for different services, predefined priorities are as follows: A priority of an ultra-reliable low-latency communication (URLLC) service is higher than a priority of a V2X service, the priority of the V2X service is higher than a priority of an enhanced mobile broadband (eMBB) service, and the priority of the eMBB service is higher than a priority of a massive machine-type communications (mMTC) service.

In an example, in a scenario in which a transmit power of the first communications device is limited or a service on a cellular link overlaps the V2X service in terms of time, when V2X transmission overlaps or conflicts with the following signals on the cellular link, the first communications device sends a channel or a reference signal based on the following priorities:

Manner 1: A reference signal used for beam measurement on a sidelink (Sidelink Beam Reference Signal, SBRS) has the highest priority, and another reference signal or a channel has the second highest priority. For example, the priority of the sidelink beam reference signal (SBRS) is higher than a priority of a synchronization signal block (SSB), the priority of the SSB is higher than a priority of a physical random access channel (PRACH), the priority of the PRACH is higher than a priority of a sounding reference signal (SRS), and the priority of the SRS is higher than a priority of a demodulation reference signal (DMRS).

Manner 2: The first communications device determines priorities of an SBRS, a PRACH, and an SRS according to indication information of the base station.

Manner 3: The first communications device determines priorities of reference signals in a predefinition manner. For example, an SBRS has the highest priority, and an SSB has the second highest priority. Alternatively, an SSB has the highest priority, and an SBRS has the second highest priority. Alternatively, a priority of an SRS/a PRACH is higher than a priority of an SBRS, and the priority of the SBRS is higher than a priority of a short physical uplink control channel (sPUCCH). Alternatively, a priority of an sPUCCH is higher than a priority of an SBRS.

It can be learned from the foregoing descriptions that a larger subcarrier spacing of the first transmission resource indicates a shorter symbol length or a shorter slot length of the first transmission resource. A shorter symbol length or a shorter slot length of the first transmission resource indicates less impact on transmission of the first message, and therefore indicates a higher first transmit power allocated by the first communications device. In addition, a larger subcarrier spacing of the first transmission resource indicates smaller time diversity of the first transmission resource. Therefore, the first communications device needs to cancel out a decrease in a diversity gain with a higher transmit power. In this way, in this embodiment of this application, there is a positive correlation between the first transmit power and the subcarrier spacing of the first transmission resource. In other words, a larger subcarrier spacing of the first transmission resource indicates a higher first transmit power.

In an embodiment, the first communications device may determine the first transmit power and the second transmit power according to the following formula (1) or formula (2):

$$P1 = a1 \times u1 \times P0$$

$$P2 = b1 \times u2 \times P0 \quad (1); \text{ and}$$

$$P1 = a1 \times u1/u2 \times P0$$

$$P2 = b1u2/u1 \times P0 \quad (2)$$

P1 represents the first transmit power, P2 represents the second transmit power, P0 represents the configured power, u1 represents the subcarrier spacing of the first transmission resource, u2 represents the subcarrier spacing of the second transmission resource, and both a1 and b1 are nonnegative constants.

Certainly, the formula (1) or formula (2) may alternatively be represented in another form, for example, represented as a logarithmic formula.

In addition, a type of a synchronization reference source used by the first communications device to send the first message is the same as that used by the first communications device to send the second message. Alternatively, a synchronization reference source transmission resource used by the first communications device to send the first message is the same as a synchronization reference source used by the first communications device to send the second message. In this way, a timing of transmission of the first message remains the same as that of transmission of the second message, thereby avoiding mutual interference caused by different timings in a message transmission process.

In an embodiment, the first communications device may send the first message and the second message to a same device, or may send the first message and the second message to different devices.

In an embodiment, when sending the first message, the first communications device may further send first indication information used to indicate the first transmit power. When sending the second message, the first communications device may further send second indication information used to indicate the second transmit power.

Figure 10:
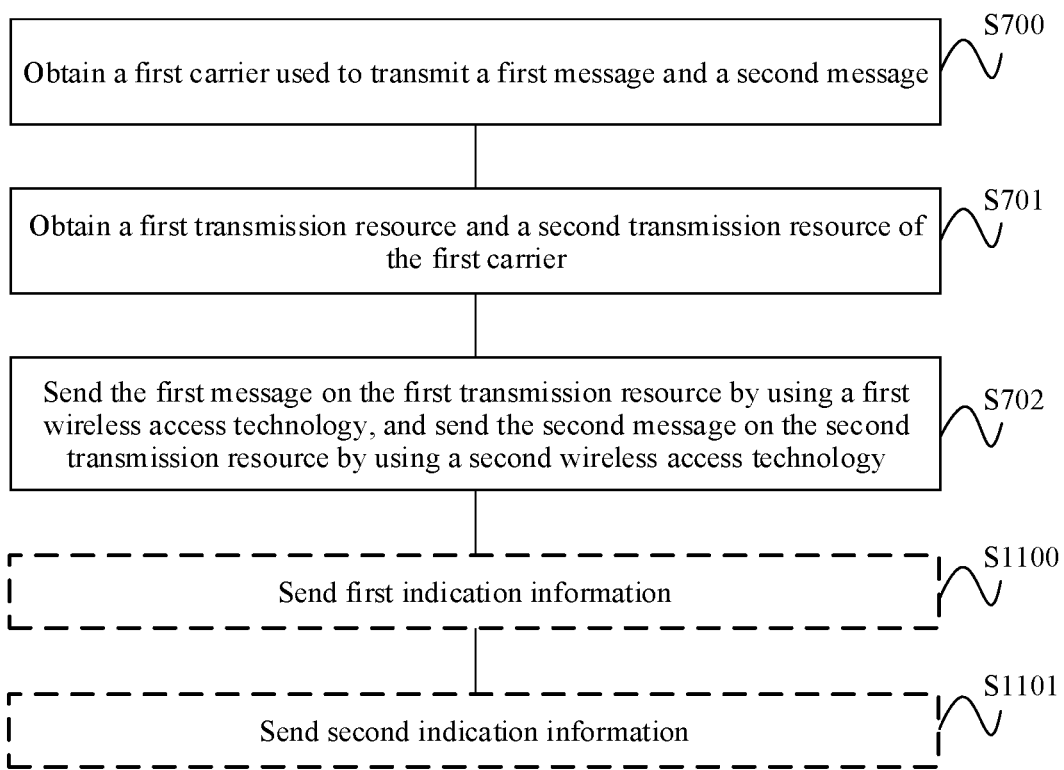
FIG. 10 is a second schematic flowchart of a communication method according to an embodiment of this application.

With reference to FIG. 7, as shown in FIG. 10, the communication method provided in this embodiment of this application may further include at least one of S1100 and S1101. S1100 and S1101 are optional, and therefore are represented by dashed-line boxes in FIG. 10.

S1100. The first communications device sends the first indication information.

In an embodiment, the first communications device may simultaneously send the first indication information and the first message, or may separately send the first indication information and the first message. This is not limited in this embodiment of this application.

S1101. The first communications device sends the second indication information.

In an embodiment, the first communications device may simultaneously send the second indication information and the second message, or may separately send the second indication information and the second message. This is not limited in this embodiment of this application.

In an embodiment, if the first communications device obtains the first transmission resource from the first resource set, and obtains the second transmission resource from the second resource set, the first communications device may further send third indication information used to indicate the first transmission resource and fourth indication information used to indicate the second transmission resource.

Figure 11:
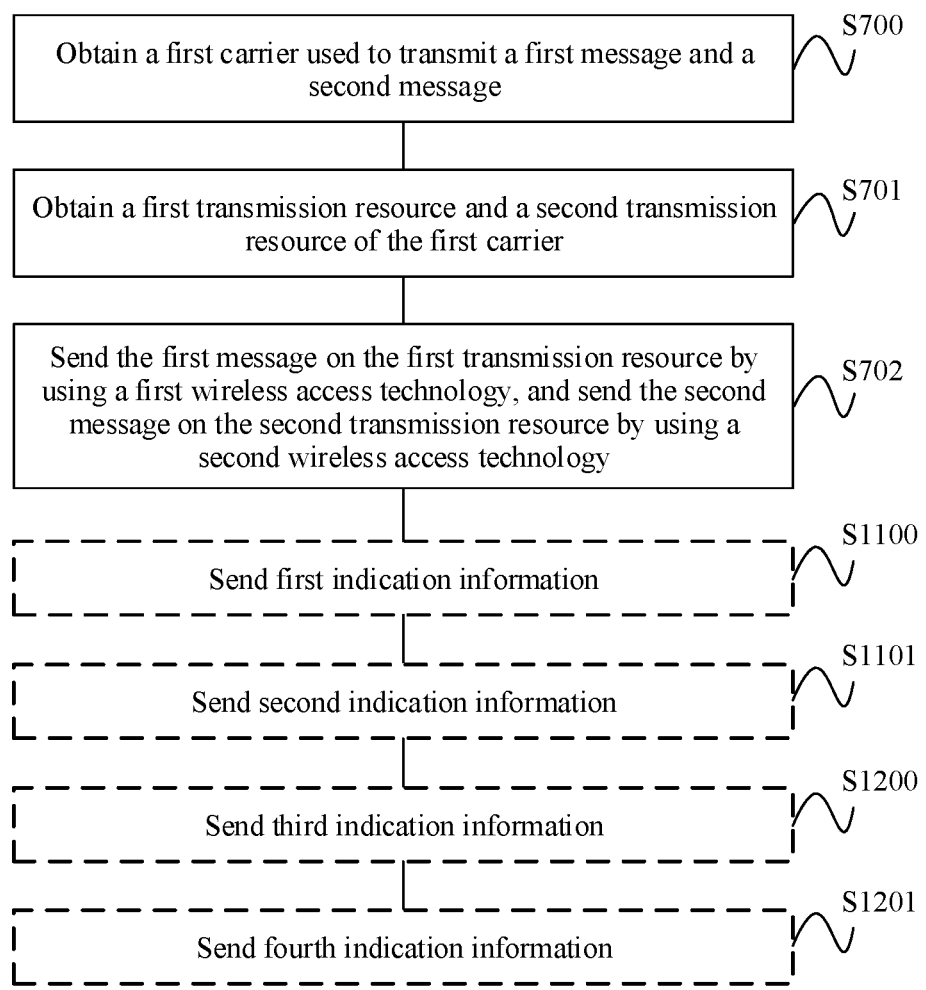
FIG. 11 is a third schematic flowchart of a communication method according to an embodiment of this application.

With reference to FIG. 10, as shown in FIG. 11, the communication method provided in this embodiment of this application may further include at least one of S1200 and S1201. S1200 and S1201 are optional, and therefore are represented by dashed-line boxes in FIG. 11.

S1200. The first communications device sends the third indication information.

In an embodiment, the first communications device may simultaneously send the third indication information and the first message, or may separately send the third indication information and the first message. This is not limited in this embodiment of this application. Similarly, in a scenario in which the first communications device sends the first indication information and the third indication information, the first communications device may simultaneously send the first indication information and the third indication information, or may separately send the first indication information and the third indication information. This is not limited in this embodiment of this application.

S1201. The first communications device sends the fourth indication information.

In an embodiment, the first communications device may simultaneously send the fourth indication information and the second message, or may separately send the fourth indication information and the second message. This is not limited in this embodiment of this application. Similarly, in a scenario in which the first communications device sends the second indication information and the fourth indication information, the first communications device may simultaneously send the second indication information and the fourth indication information, or may separately send the second indication information and the fourth indication information. This is not limited in this embodiment of this application.

In an embodiment, if the first communications device obtains the first transmission resource from the fourth resource set, when sending the first message, the first communications device may further send fifth indication information used to indicate the third resource set and sixth indication information used to indicate the fourth resource set. When sending the second message, the first communications device may further send the fifth indication information.

Figure 12:
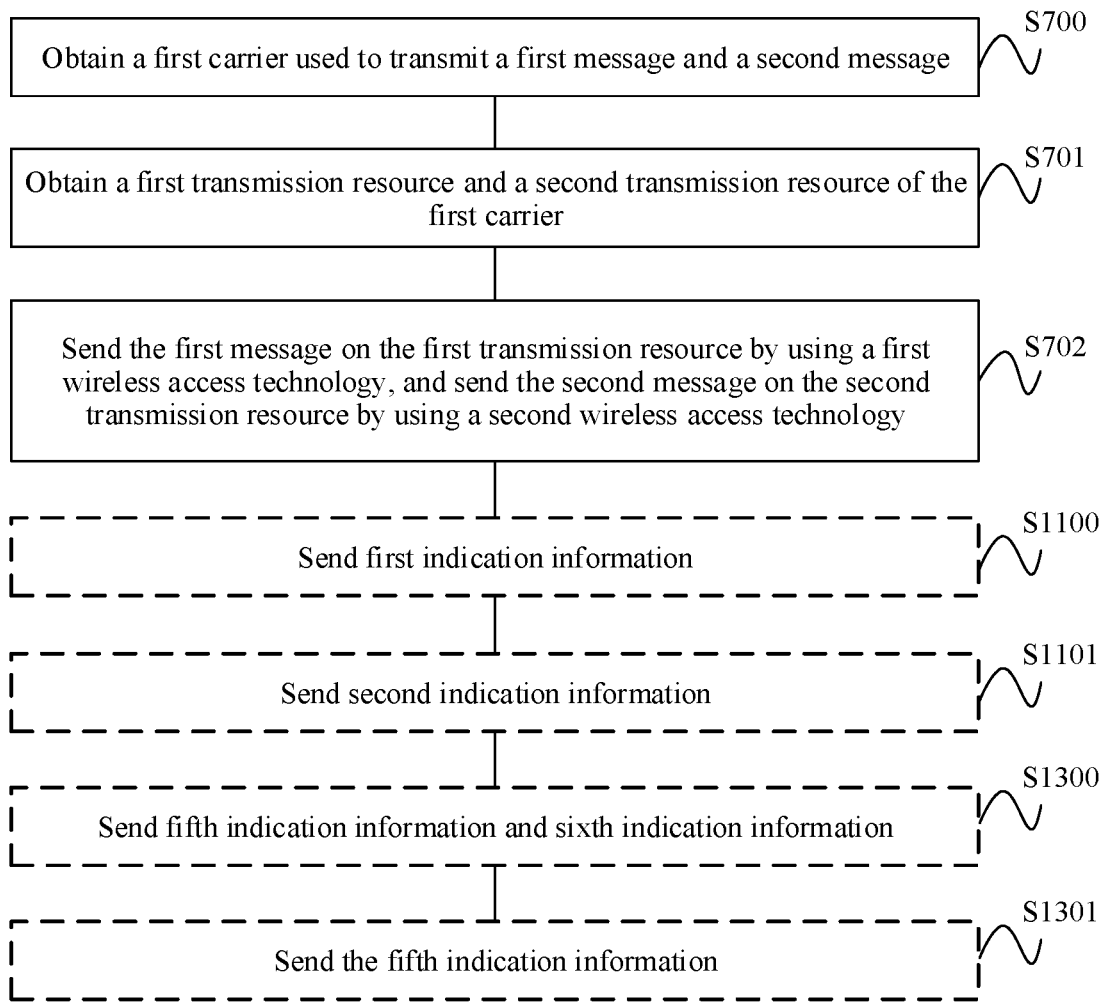
FIG. 12 is a fourth schematic flowchart of a communication method according to an embodiment of this application.

With reference to FIG. 10, as shown in FIG. 12, the communication method provided in this embodiment of this application may further include at least one of S1300 and S1301. S1300 and S1301 are optional, and therefore are represented by dashed-line boxes in FIG. 12.

S1300. The first communications device sends the fifth indication information and the sixth indication information.

In an embodiment, the first communications device may simultaneously send the fifth indication information, the sixth indication information, and the first message. Alternatively, the fifth indication information and the sixth indication information may be simultaneously sent, and the first message may be separately sent. This is not limited in this embodiment of this application. Similarly, in a scenario in which the first communications device sends the first indication information, the fifth indication information, and the sixth indication information, the first communications device may simultaneously send the first indication information, the fifth indication information, and the sixth indication information. Alternatively, the fifth indication information and the sixth indication information may be simultaneously sent, and the first indication information may be separately sent. This is not limited in this embodiment of this application.

S1301. The first communications device sends the fifth indication information.

In an embodiment, the first communications device may simultaneously send the fifth indication information and the second message, or may separately send the fifth indication information and the second message. This is not limited in this embodiment of this application. Similarly, in a scenario in which the first communications device sends the second indication information and the fifth indication information, the first communications device may simultaneously send the second indication information and the fifth indication information, or may separately send the second indication information and the fifth indication information. This is not limited in this embodiment of this application.

It should be noted that if the first communications device sends the first message and the second message to a same device, the first communications device only needs to perform S1300.

It can be learned from the foregoing descriptions that because the first wireless access technology and a second access network technology are different, and the first transmission resource and the second transmission resource are different, the first communications device can send the first message on the first transmission resource by using the first wireless access technology, and can further send the second message on the second transmission resource by using the second wireless access technology, to achieve coexistence of two different types of services. Herein, "independent of each other" means that the subcarrier spacing of the first transmission resource and the subcarrier spacing of the second transmission resource are separately configured and are not associated in values.

In an embodiment, if the first wireless access technology is the V2X communications technology in the 5G system, and the second wireless access technology is the V2X communications technology in the LTE system, effective coexistence of the V2X communications technology in the 5G system and the V2X communications technology in the LTE system can be achieved by using the communication method provided in this application.

Figure 13:
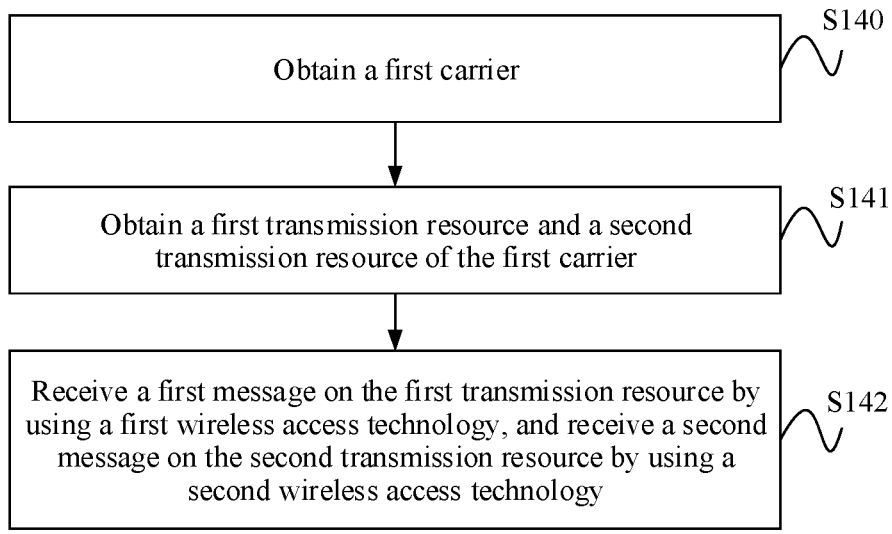
FIG. 13 is a fifth schematic flowchart of a communication method according to an embodiment of this application.

FIG. 13 is another schematic flowchart of a communication method according to an embodiment of this application. The communication method may be applied to the communications system shown in FIG. 1 or FIG. 4.

A procedure shown in FIG. 13 is described by using an example in which the procedure is performed by a second communications device. The second communications device is a receive-end device, and may be the remote device, the relay device, the RSU, or the base station above, or certainly may be a chip in any one of the foregoing devices. This is not limited in this embodiment of this application.

As shown in FIG. 13, the communication method provided in this embodiment of this application includes the following operations.

S140. The second communications device obtains a first carrier.

For the first carrier, refer to the descriptions in the embodiment shown in FIG. 7. Details are not described herein again. A method for obtaining the first carrier by the second communications device is similar to the method for obtaining the first carrier by the first communications device. For details, refer to the descriptions of S700. Details are not described herein again. A difference lies in that the second communications device is a receive-end device, and the first communications device is a transmit-end device.

S141. The second communications device obtains a first transmission resource and a second transmission resource of the first carrier.

A method for obtaining the first transmission resource of the first carrier by the second communications device is similar to the method for obtaining the first transmission resource of the first carrier by the first communications device. For details, refer to the descriptions of S701. Details are not described herein again.

A method for obtaining the second transmission resource of the first carrier by the second communications device is similar to the method for obtaining the second transmission resource of the first carrier by the first communications device. For details, refer to the descriptions of S701. Details are not described herein again.

A difference lies in that the second communications device may further obtain third indication information and fourth indication information, obtain the first resource set according to the third indication information, and obtain the second resource set according to the fourth indication information. In an embodiment, the third indication information and the fourth indication information that are obtained by the second communications device may be sent from a transmit end, or may be predefined, or may be indicated by a network device by using signaling. This is not limited in this embodiment of this application. Alternatively, the second communications device obtains fifth indication information and sixth indication information, determines the fourth resource set according to the fifth indication information and the sixth indication information, and determines the third resource set according to the fifth indication information. In an embodiment, the fifth indication information and the sixth indication information that are obtained by the second communications device may be sent from a transmit end, or may be predefined, or may be indicated by a network device by using signaling. This is not limited in this embodiment of this application.

S142. The second communications device receives a first message on the first transmission resource by using a first wireless access technology, and receives a second message on the second transmission resource by using a second wireless access technology.

In an embodiment, a type of a synchronization reference source used by the second communications device to receive the first message is the same as that used by the second communications device to receive the second message. Alternatively, a synchronization reference source transmission resource used by the second communications device to receive the first message is the same as a synchronization reference source used by the second communications device to receive the second message.

In an embodiment, the second communications device may receive the first message and the second message that are sent by a same device, or may receive the first message and the second message that are sent from different devices.

In an embodiment, the second communications device may further obtain first indication information and/or second indication information. In this way, the second communications device can determine first transmit powers and second transmit powers at different transmission moments according to the received indication information, so that the second communications device can obtain accurate channel information during receiving measurement, to select a sending resource more accurately.

Figure 14:
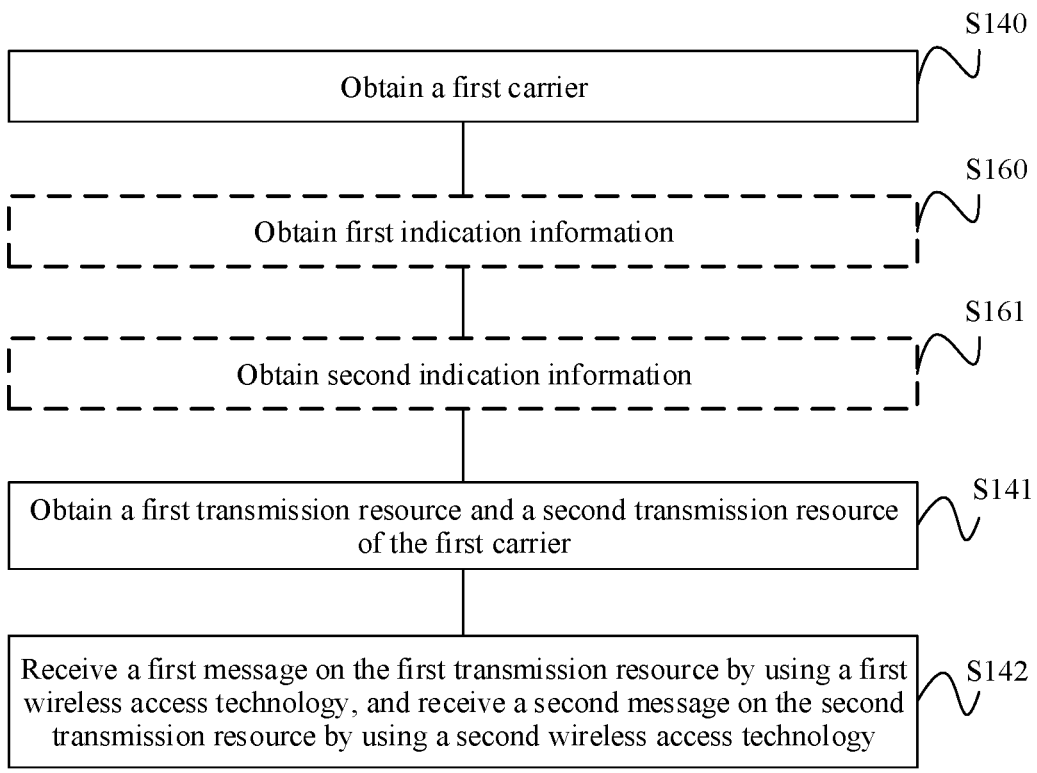
FIG. 14 is a sixth schematic flowchart of a communication method according to an embodiment of this application.

With reference to FIG. 13, as shown in FIG. 14, the communication method provided in this embodiment of this application may further include at least one of S160 and S161. S160 and S161 are optional, and therefore are represented by dashed-line boxes in FIG. 14.

S160. The second communications device obtains the first indication information.

S161. The second communications device obtains the second indication information.

It can be learned from the foregoing descriptions that the second communications device may further obtain the third indication information, determine the first resource set according to the third indication information, and further obtain the first transmission resource from the first resource set. In addition, the second communications device may further obtain the fourth indication information, determine the second resource set according to the fourth indication information, and further obtain the second transmission resource from the second resource set.

Figure 15:
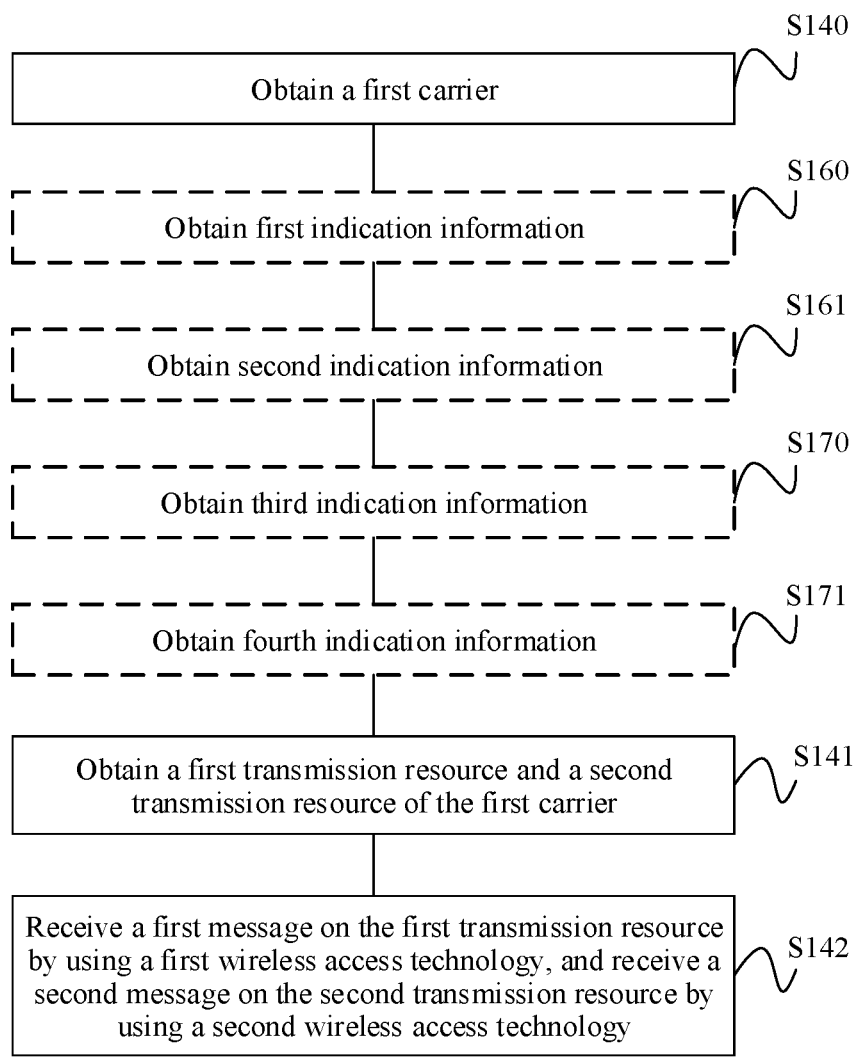
FIG. 15 is a seventh schematic flowchart of a communication method according to an embodiment of this application.

With reference to FIG. 14, as shown in FIG. 15, the communication method provided in this embodiment of this application may further include at least one of S170 and S171. S170 and S171 are optional, and therefore are represented by dashed-line boxes in FIG. 15.

S170. The second communications device obtains the third indication information.

S171. The second communications device obtains the fourth indication information.

It can be learned from the foregoing descriptions that the second communications device may further obtain the fifth indication information and the sixth indication information, determine the fourth resource set according to the fifth indication information and the sixth indication information, and further obtain the first transmission resource from the fourth resource set.

Figure 16:
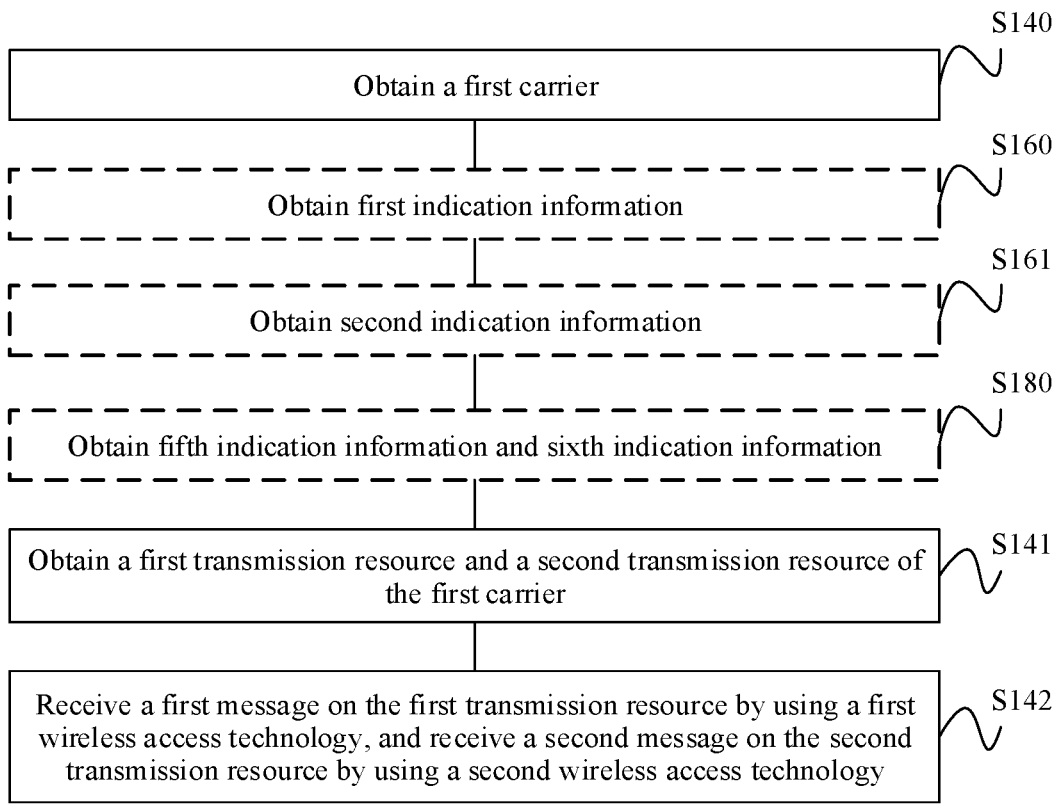
FIG. 16 is an eighth schematic flowchart of a communication method according to an embodiment of this application.

With reference to FIG. 14, as shown in FIG. 16, the communication method provided in this embodiment of this application may further include S180.

S180. The second communications device obtains the fifth indication information and the sixth indication information.

It can be learned from the foregoing descriptions that because the first wireless access technology and a second access network technology are different, and the first transmission resource and the second transmission resource are different, the second communications device can receive the first message on the first transmission resource by using the first wireless access technology, and can further receive the second message on the second transmission resource by using the second wireless access technology, to achieve coexistence of two different types of services.

In an embodiment, if the first wireless access technology is a V2X communications technology in a 5G system, and the second wireless access technology is a V2X communications technology in an LTE system, effective coexistence of the V2X communications technology in the LTE system and the V2X communications technology in the 5G system can be achieved by using the communication method provided in this application.

In addition to the foregoing descriptions, in the communication method provided in this application, the first communications device may further achieve coexistence of different services on different carriers. Specifically, the first communications device obtains a first carrier used to transmit a first message and obtains a second carrier used to transmit a second message, and then determines a first transmit power for sending the first message on the first carrier and determines a second transmit power for sending the second message on the second carrier. In this way, the first communications device can send the first message on the first carrier at the first transmit power and by using a first wireless access technology, and send the second message on the second carrier at the second transmit power and by using a second wireless access technology. Descriptions herein are similar to the foregoing descriptions, and a sum of the first transmit power and the second transmit power is less than or equal to a configured power. It is easily understood that, an operation performed by the first communications device in this scenario is similar to the operation performed by the first communications device in the foregoing scenario in which the first communications device occupies the first transmission resource and the second transmission resource in the FDM mode. Details are not described herein again.

In conclusion, coexistence of different types of services is achieved by using the communication method provided in this application.

An embodiment of this application provides a communications device. The communications device may be a first communications device, or may be some apparatuses in the first communications device, for example, a chip system in the first communications device. In an embodiment, the chip system is configured to support the first communications device in implementing a function in the foregoing method embodiment, for example, sending or processing data and/or information in the foregoing method. The chip system includes a chip, and may further include another discrete component or circuit structure.

The first communications device is a remote device, a relay device, an RSU, a base station, or a distributed unit (Distributed Unit, DU) in a base station system. The communications device is configured to perform the operations performed by the first communications device in the foregoing communication method. The communications device provided in this embodiment of this application may include modules corresponding to corresponding operations.

In an embodiment of this application, the communications device may be divided into function modules based on the foregoing method examples. For example, each function module may be obtained through division based on a corresponding function, or two or more functions may be integrated into one processing module. The integrated module may be implemented in a form of hardware, or may be implemented in a form of a software function module. In this embodiment of this application, module division is an example, and is merely logical function division. In an actual implementation, another division manner may be used.

Figure 17:
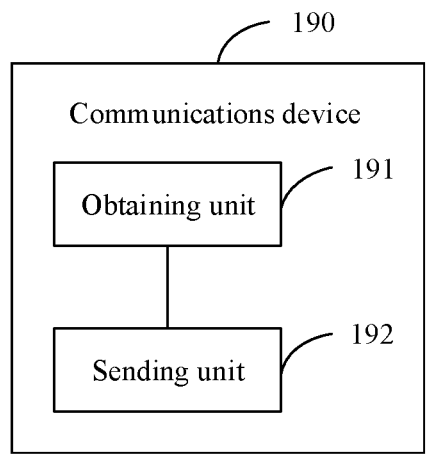
FIG. 17 is a first schematic structural diagram of a communications device according to an embodiment of this application.

When each function module is obtained through division based on a corresponding function, FIG. 17 is a possible schematic structural diagram of a communications device 190. As shown in FIG. 17, the communications device 190 includes an obtaining unit 191 and a sending unit 192.

The obtaining unit 191 is configured to support the communications device 190 in performing S700 and S701 in the foregoing embodiment and/or another process used for the technology described in this specification.

The sending unit 192 is configured to support the communications device 190 in performing S702, S1100, S1101, S1200, S1201, S1300, and S1301 in the foregoing embodiment and/or another process used for the technology described in this specification.

Figure 18:
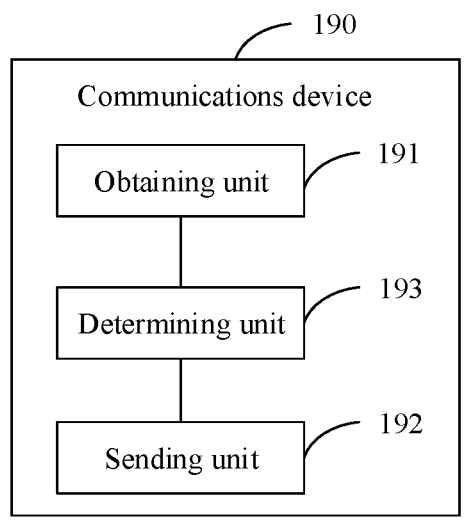
FIG. 18 is a second schematic structural diagram of a communications device according to an embodiment of this application.

As shown in FIG. 18, the communications device 190 further includes a determining unit 193. The determining unit 193 is configured to indicate the communications device 190 to: determine a first transmit power, and determine a second transmit power.

Certainly, the communications device 190 provided in this embodiment of this application includes but is not limited to the foregoing modules. For example, the communications device 190 may further include a storage unit.

The storage unit may be configured to store program code of the communications device 190. All related content of the operations in the foregoing method embodiment may be cited in function descriptions of corresponding function modules. Details are not described herein again.

When the communications device 190 is a terminal, the obtaining unit 191 may be the processor 301 in FIG. 5, the sending unit 192 may be the antenna in FIG. 5, and the storage unit may be the memory 303 in FIG. 5.

When the communications device 190 is a base station, the obtaining unit 191 may be the processor 61 in FIG. 6, the sending unit 192 may be the transceiver 64 in FIG. 6, and the storage unit may be the memory 62 in FIG. 6.

When the communications device 190 runs, the communications device 190 performs the operations performed by the first communications device in the communication method in the embodiment shown in FIG. 7, FIG. 10, FIG. 11, or FIG. 12.

Another embodiment of this application further provides a computer-readable storage medium. The computer-readable storage medium stores an instruction; when the instruction is run on the communications device 190, the communications device 190 performs the operations performed by the first communications device in the communication method in the embodiment shown in FIG. 7, FIG. 10, FIG. 11, or FIG. 12.

In another embodiment of this application, a computer program product is further provided. The computer program product includes a computer-executable instruction; the computer-executable instruction is stored in a computer-readable storage medium. At least one processor of the communications device 190 may read the computer-executable instruction from the computer-readable storage medium, and the at least one processor executes the computer-executable instruction, so that the communications device 190 performs the operations performed by the first communications device in the communication method shown in FIG. 7, FIG. 10, FIG. 11, or FIG. 12.

An embodiment of this application provides a communications device. The communications device 200 is a second communications device, or may be a chip in the second communications device. The second communications device is a remote device, a relay device, an RSU, a base station, or a DU in a base station system. The communications device is configured to perform the operations performed by the second communications device in the foregoing communication method. The communications device provided in this embodiment of this application may include modules corresponding to corresponding operations.

In an embodiment of this application, the communications device may be divided into function modules based on the foregoing method examples. For example, each function module may be obtained through division based on a corresponding function, or two or more functions may be integrated into one processing module. The integrated module may be implemented in a form of hardware, or may be implemented in a form of a software function module. In an embodiment of this application, module division is an example, and is merely logical function division. In an actual implementation, another division manner may be used.

Figure 19:
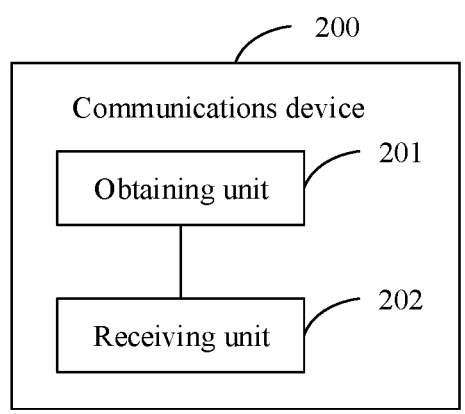
FIG. 19 is a third schematic structural diagram of a communications device according to an embodiment of this application.

When each function module is obtained through division based on a corresponding function, FIG. 19 is a possible schematic structural diagram of a communications device 200. As shown in FIG. 19, the communications device 200 includes an obtaining unit 201 and a receiving unit 202.

The obtaining unit 201 is configured to support the communications device 200 in performing S140, S141, S160, S161, S170, S171, and S180 in the foregoing embodiment and/or another process used for the technology described in this specification.

The receiving unit 202 is configured to support the communications device 200 in performing S142 in the foregoing embodiment and/or another process used for the technology described in this specification.

Certainly, the communications device 200 provided in this embodiment of this application includes but is not limited to the foregoing modules. For example, the communications device 200 may further include a storage unit.

The storage unit may be configured to store program code of the communications device 200. All related content of the operations in the foregoing method embodiment may be cited in function descriptions of corresponding function modules. Details are not described herein again.

When the communications device 200 is a terminal, the obtaining unit 201 may be the processor 301 in FIG. 5, the receiving unit 202 may be the antenna in FIG. 5, and the storage unit may be the memory 303 in FIG. 5.

When the communications device 200 is a base station, the obtaining unit 201 may be the processor 61 in FIG. 6, the receiving unit 202 may be the transceiver 64 in FIG. 6, and the storage unit may be the memory 62 in FIG. 6.

When the communications device 200 runs, the communications device 200 performs the operations performed by the second communications device in the communication method in the embodiment shown in any one of the accompanying drawings FIG. 13 to FIG. 16.

Another embodiment of this application further provides a computer-readable storage medium. The computer-readable storage medium stores an instruction; when the instruction is run on the communications device 200, the communications device 200 performs the operations performed by the second communications device in the communication method in the embodiment shown in any one of the accompanying drawings FIG. 13 to FIG. 16.

In another embodiment of this application, a computer program product is further provided. The computer program product includes a computer-executable instruction, and the computer-executable instruction is stored in a computer-readable storage medium. At least one processor of the communications device 200 may read the computer-executable instruction from the computer-readable storage medium, and the at least one processor executes the computer-executable instruction, so that the communications device 200 performs the operations performed by the second communications device in the communication method shown in any one of the accompanying drawings FIG. 13 to FIG. 16.

All or some of the foregoing embodiments may be implemented through software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data terminal device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The descriptions of the foregoing implementations allow a person skilled in the art to clearly understand that, for the purpose of convenient and brief description, division into the foregoing function modules is taken as an example for illustration. In an actual application, the foregoing functions may be allocated to different modules for implementation based on a requirement, that is, an inner structure of an apparatus is divided into different function modules to implement all or some of the functions described above.

In the specification, claims, and accompanying drawings of this application, the terms "first", "second", "third" and the like are intended to distinguish between different objects but not to limit a particular order.

In the embodiments of this application, the word such as "example" or "for example" is used to represent giving an example, an illustration, or a description. Any embodiment or design scheme described as "example" or "for example" in the embodiments of this application should not be explained as being more preferred or having more advantages than another embodiment or design scheme. Exactly, use of the word such as "example" or "for example" is intended to present a relative concept in a specific manner.

In the several embodiments provided in this application, it should be understood that the disclosed apparatus and method may be implemented in other manners. For example, the described apparatus embodiments are merely examples. For example, the module or unit division is merely logical function division and may be another division manner in an actual implementation. For example, a plurality of units or components may be combined or integrated into another apparatus, or some features may be ignored or not performed. In addition, the displayed or discussed mutual couplings or direct couplings or communication connections may be implemented via some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, comprising:
    obtaining, by a first communications device, a first carrier to transmit a first message and a second message;
    obtaining, by the first communications device, a first transmission resource and a second transmission resource of the first carrier to send the first message and the second message respectively, and the first transmission resource and the second transmission resource are different transmission resources;
    sending, by the first communications device, the first message on the first transmission resource using a first wireless access technology;
    sending, by the first communications device, the second message on the second transmission resource using a second wireless access technology, wherein the first wireless access technology and the second wireless access technology are different inter-device direct communications technologies; and
    determining, by the first communications device, a first transmit power and a second transmit power, wherein a sum of the first transmit power and the second transmit power is less than or equal to a configured power indicated by first signaling received from a network device, wherein the first message is sent at the first transmit power and the second message is sent at the second transmit power.

2. The communication method according to claim 1, further comprising:
    sending, by the first communications device, first indication information used to indicate the first transmit power; and
    sending, by the first communications device, second indication information used to indicate the second transmit power.

3. The communication method according to claim 1, further comprising:
    occupying, by the first communications device, the first transmission resource and the second transmission resource in a time division multiplexing (TDM) mode.

4. The communication method according to claim 3, wherein obtaining a first transmission resource and a second transmission resource of the first carrier comprises:
    obtaining, by the first communications device, a first resource set and a second resource set of the first carrier, wherein a time-domain resource unit of the first resource set is determined based on a subcarrier spacing of the first transmission resource, and a time-domain resource unit of the second resource set is determined based on a subcarrier spacing of the second transmission resource;
    obtaining, by the first communications device, the first transmission resource from the first resource set based on first configuration information indicating at least one time-domain resource unit in the first resource set; and
    obtaining the second transmission resource from the second resource set based on second configuration information indicating at least one time-domain resource unit in the second resource set, wherein the first configuration information is preconfigured or indicated by second signaling sent by the network device, and the second configuration information is preconfigured or indicated by third signaling sent by the network device.

5. The communication method according to claim 3, wherein obtaining a first transmission resource of the first carrier comprises:
    obtaining, by the first communications device, a third resource set and a fourth resource set of the first carrier, wherein the fourth resource set is a subset of the third resource set, a time-domain resource unit of the third resource set is determined based on a subcarrier spacing of the second transmission resource, and a time-domain resource unit of the fourth resource set is determined based on a subcarrier spacing of the first transmission resource; and
    obtaining, by the first communications device, the first transmission resource from the fourth resource set based on third configuration information, indicating at least one time-domain resource unit in the fourth resource set, wherein the third configuration information is preconfigured or is indicated by fourth signaling sent by the network device.

6. The communication method according to claim 1, wherein
    the first transmission resource and the second transmission resource both belong to a first resource pool and are orthogonal to each other; or
    the first transmission resource belongs to a second resource pool, the second transmission resource belongs to a third resource pool, and the second resource pool and the third resource pool are orthogonal to each other.

7. The communication method according to claim 1, wherein obtaining a first carrier comprises:

determining, by the first communications device, the first carrier; or receiving, by the first communications device, carrier indication information from the network device, indicating the first carrier; and obtaining the first carrier according to the carrier indication information.

8. A communication method, comprising:

obtaining, by a second communications device, a first carrier to transmit a first message and a second message;

obtaining, by the second communications device, a first transmission resource and a second transmission resource of the first carrier to receive the first message and the second message respectively, wherein the first transmission resource is different from the second transmission resource;

receiving, by the second communications device, the first message on the first transmission resource using a first wireless access technology;

receiving, by the second communications device, the second message on the second transmission resource using a second wireless access technology, wherein the first wireless access technology and the second wireless access technology are different inter-device direct communications technologies;

obtaining, by the second communications device, first indication information indicating a transmit power of the first message; and obtaining, by the second communications device, second indication information indicating a transmit power of the second message, wherein a sum of the transmit power of the first message and the transmit power of the second message is less than or equal to a configured power, which is indicated by signaling sent by a network device.

9. The communication method according to claim 8, wherein obtaining a first transmission resource and a second transmission resource of the first carrier comprises:

obtaining, by the second communications device, a first resource set and a second resource set of the first carrier, wherein a time-domain resource unit of the first resource set is determined based on a subcarrier spacing of the first transmission resource, and a time-domain resource unit of the second resource set is determined based on a subcarrier spacing of the second transmission resource;

obtaining, by the second communications device, the first transmission resource from the first resource set based on first configuration information indicating at least one time-domain resource unit in the first resource set, wherein the first configuration information is preconfigured, indicated by second signaling sent by the network device, or sent by a first communications device; and obtaining the second transmission resource from the second resource set based on second configuration information indicating at least one time-domain resource unit in the second resource set, wherein the second configuration information is preconfigured, indicated by third signaling sent by the network device, or sent by a third communications device.

10. The communication method according to claim 8, wherein obtaining a first transmission resource of the first carrier comprises:

obtaining, by the second communications device, a third resource set and a fourth resource set of the first carrier, wherein the fourth resource set is a subset of the third resource set, a time-domain resource unit of the third resource set is determined based on a subcarrier spacing of the second transmission resource, and a time-domain resource unit of the fourth resource set is determined based on a subcarrier spacing of the first transmission resource; and obtaining, by the second communications device, the first transmission resource from the fourth resource set based on third configuration information indicating at least one time-domain resource unit in the fourth resource set, wherein the third configuration information is preconfigured, indicated by fourth signaling sent by the network device, or sent by a first communications device.

11. The communication method according to claim 8, wherein the first transmission resource and the second transmission resource both belong to a first resource pool and are orthogonal to each other; or the first transmission resource belongs to a second resource pool, the second transmission resource belongs to a third resource pool, and the second resource pool and the third resource pool are orthogonal to each other.

12. The communication method according to claim 8, wherein obtaining a first carrier comprises:

determining, by the second communications device, the first carrier; or receiving, by the second communications device, carrier indication information from the network device, indicating the first carrier; and obtaining the first carrier according to the carrier indication information.

13. A communications device operating as a first communications device, comprising:

an obtaining unit configured to:
obtain a first carrier to transmit a first message and a second message, and
obtain a first transmission resource and a second transmission resource of the first carrier to send the first message and the second message respectively, wherein the first transmission resource and the second transmission resource are different transmission resources; and a sending unit configured to:
send, using a first wireless access technology, the first message on the first transmission resource, and
send, using a second wireless access technology, the second message on the second transmission resource, wherein the first wireless access technology and the second wireless access technology are different inter-device direct communications technologies; and a determining unit configured to:
determine a first transmit power and a second transmit power, wherein a sum of the first transmit power and the second transmit power is less than or equal to a configured power, which is indicated by first signaling sent by a network device, wherein the sending unit is configured to: send the first message on the first transmission resource at the first transmit power using the first wireless access technology, and send the second message on the second transmission resource at the second transmit power using the second wireless access technology.

14. The communications device according to claim 13, wherein the sending unit is further configured to send first indication information and second indication information to indicate the first transmit power and the second transmit power respectively.

15. The communications device according to claim 13, wherein the sending unit is configured to occupy the first transmission resource and the second transmission resource in a time division multiplexing (TDM) mode.

16. The communications device according to claim 15, wherein the obtaining unit is further configured to:
    obtain a first resource set and a second resource set of the first carrier, wherein a time-domain resource unit of the first resource set is determined based on a subcarrier spacing of the first transmission resource, and a time-domain resource unit of the second resource set is determined based on a subcarrier spacing of the second transmission resource;
    obtain the first transmission resource from the first resource set based on first configuration information indicating at least one time-domain resource unit in the first resource set, wherein the first configuration information is preconfigured or is indicated by second signaling sent by the network device; and
    obtain the second transmission resource from the second resource set based on second configuration information indicating at least one time-domain resource unit in the second resource set, wherein the second configuration information is preconfigured or is indicated by third signaling sent by the network device.

17. The communications device according to claim 15, wherein the obtaining unit is further configured to:
    obtain a third resource set and a fourth resource set of the first carrier, wherein the fourth resource set is a subset of the third resource set, a time-domain resource unit of the third resource set is determined based on a subcarrier spacing of the second transmission resource, and a time-domain resource unit of the fourth resource set is determined based on a subcarrier spacing of the first transmission resource; and
    obtain the first transmission resource from the fourth resource set based on third configuration information, wherein the third configuration information is used to indicate at least one time-domain resource unit in the fourth resource set, and the third configuration information is preconfigured or is indicated by fourth signaling sent by the network device.

* * * * *